US012811453B2

(12) United States Patent
Hagnestål et al.

(10) Patent No.: US 12,811,453 B2
(45) Date of Patent: Nov. 24, 2026

(54) ELECTRICAL MACHINE WITH AN ISOLATED ROTOR

(71) Applicant: HAGNESIA AB, Hindås (SE)

(72) Inventors: Anders Hagnestål, Hindås (SE); Mårten Keijser, Sundbyberg (SE)

(73) Assignee: HAGNESIA AB, Hindås (SE)

(*) Notice: Subject to any disclaimer, the term of this patent is extended or adjusted under 35 U.S.C. 154(b) by 607 days.

(21) Appl. No.: 18/043,710

(22) PCT Filed: Aug. 27, 2021

(86) PCT No.: PCT/SE2021/050836
§ 371 (c)(1),
(2) Date: Mar. 1, 2023

(87) PCT Pub. No.: WO2022/050888
PCT Pub. Date: Mar. 10, 2022

(65) Prior Publication Data

US 2023/0275481 A1 Aug. 31, 2023

(30) Foreign Application Priority Data

Sep. 3, 2020 (SE) .................................... 2051042-6

(51) Int. Cl.
*H02K 1/12* (2006.01)
*H02K 1/17* (2006.01)
(Continued)

(52) U.S. Cl.
CPC ................. *H02K 3/04* (2013.01); *H02K 1/12* (2013.01); *H02K 1/182* (2013.01); *H02K 16/00* (2013.01);
(Continued)

(58) Field of Classification Search
CPC ............ H02K 1/14; H02K 1/17; H02K 1/182; H02K 3/47; H02K 16/00; H02K 16/02;
(Continued)

(56) References Cited

U.S. PATENT DOCUMENTS 3,700,944 A 10/1972 Heintz
5,010,262 A * 4/1991 Nakagawa ............... B25J 9/123 318/135
(Continued)

FOREIGN PATENT DOCUMENTS

CA 2368426 7/2003
CN 110086308 8/2019
(Continued)

OTHER PUBLICATIONS

Asano, Machine Translation of JP2008211892, Sep. 2008 (Year: 2008).*
(Continued)

*Primary Examiner* — Eric Johnson
(74) *Attorney, Agent, or Firm* — Fox Rothschild LLP; Carol E. Thorstad-Forsyth

(57) ABSTRACT

An electrical machine (1) being a modulated pole machine operating by switching of magnetic flux comprises a rotor (10), a stator (20) and a winding (30). The rotor and stator have respective sections (12,22) interleaved with each other via more than 4 air gaps. At least two different sections each comprise a winding loop from the same phase winding. At least one of the sections that is part of the rotor is an isolated rotor section which comprises electrically non-conducting structure material.

17 Claims, 15 Drawing Sheets

(51) Int. Cl.

| | |
|---|---|
| ***H02K 1/18*** | (2006.01) |
| ***H02K 1/24*** | (2006.01) |
| ***H02K 3/04*** | (2006.01) |
| ***H02K 16/00*** | (2006.01) |
| ***H02K 21/44*** | (2006.01) |

(52) U.S. Cl.
CPC ............... *H02K 21/44* (2013.01); *H02K 1/17* (2013.01); *H02K 1/246* (2013.01)

(58) Field of Classification Search
CPC ...... H02K 16/04; H02K 2201/12; H02K 1/12; H02K 1/246; H02K 3/04; H02K 3/18; H02K 3/46; H02K 21/04; H02K 21/38; H02K 21/44
See application file for complete search history.

(56) References Cited

U.S. PATENT DOCUMENTS

| | | | | |
|---|---|---|---|---|
| 5,053,667 | A | 10/1991 | Oudet | |
| 5,831,367 | A * | 11/1998 | Fei | H02K 1/246 310/216.107 |
| 12,255,509 | B2 * | 3/2025 | Hagnestål | H02K 21/44 |
| 2008/0036330 | A1 | 2/2008 | Abe et al. | |
| 2008/0211326 | A1 | 9/2008 | Kang et al. | |
| 2011/0109190 | A1 | 5/2011 | Aoyama et al. | |
| 2015/0035388 | A1 | 2/2015 | Mita et al. | |
| 2016/0226357 | A1 * | 8/2016 | Rozinsky | H02K 1/143 |

FOREIGN PATENT DOCUMENTS

| | | | | |
|---|---|---|---|---|
| EP | 0527593 | | 2/1993 | |
| EP | 2787612 | | 10/2014 | |
| FR | 2606951 | A1 * | 5/1988 | H02K 21/24 |
| GB | 2559441 | A * | 8/2018 | H02K 11/042 |
| JP | 2006136156 | A * | 5/2006 | |
| JP | 2008-211892 | | 9/2008 | |
| JP | 2017-085745 | | 5/2017 | |
| WO | 96/19861 | | 6/1996 | |
| WO | 2013/122031 | | 8/2013 | |
| WO | 2014/161744 | | 10/2014 | |
| WO | 2015056268 | | 4/2015 | |
| WO | 2017/012814 | | 1/2017 | |

OTHER PUBLICATIONS

Pouillange, Machine Translation of FR2606951, May 1988 (Year: 1988).*

Kawai, Machine Translation of JP2006163156, May 2006 (Year: 2006).*

International Search Report and Written Opinion for PCT Application No. PCT/SE2021/050836, mailed Oct. 18, 2021 (8 pages).

Hagnestål, "A low cost and highly efficient TFM generator for wave power," The 3rd Asian Wave and Tidal Energy Conference AWTEC, pp. 822-828 (2016).

Hagnestål and Guldbrandzén, "A highly efficient and low-cost linear TFM generator for wave power," EWTEC 2017: the 12th European Wave and Tidal Energy Conference Aug. 27-Sep. 1, 2017, Cork, Ireland. European Wave and Tidal Energy Conference (2017).

Hagnestål, "On the Optimal Pole Width for Direct Drive Linear Wave Power Generators Using Ferrite Magnets," Energies, 11(6) pp. 1-24 (2018).

Washington et al., "Three-phase modulated pole machine topologies utilizing mutual flux paths," IEEE Transactions on Energy Conversion 27.2, pp. 507-515 (2012).

* cited by examiner

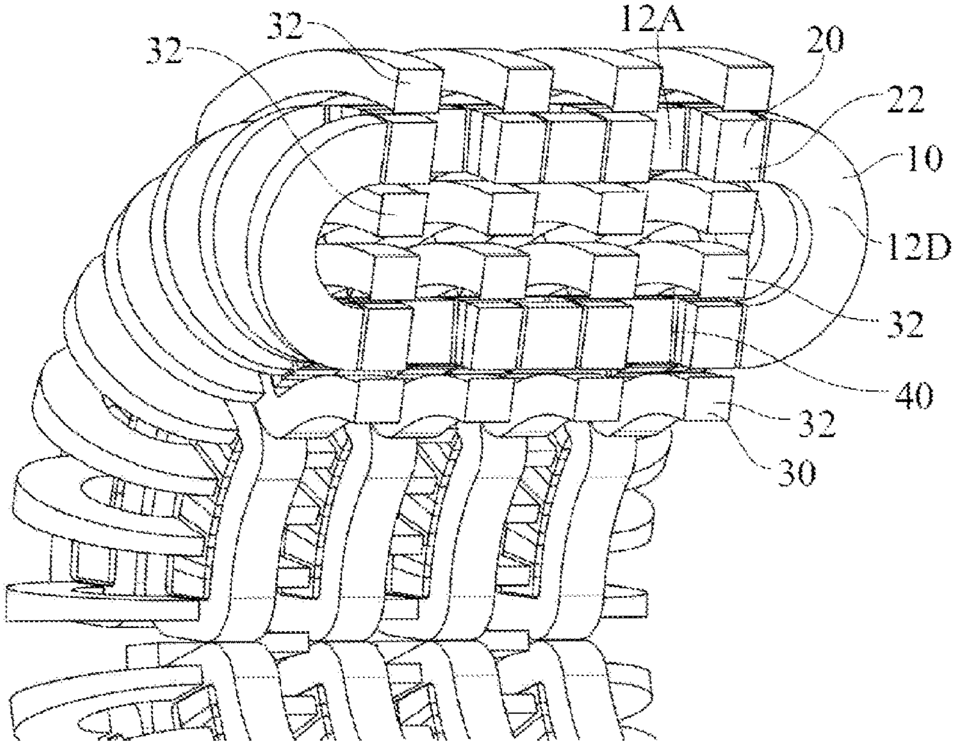
Fig. 9
Fig. 10
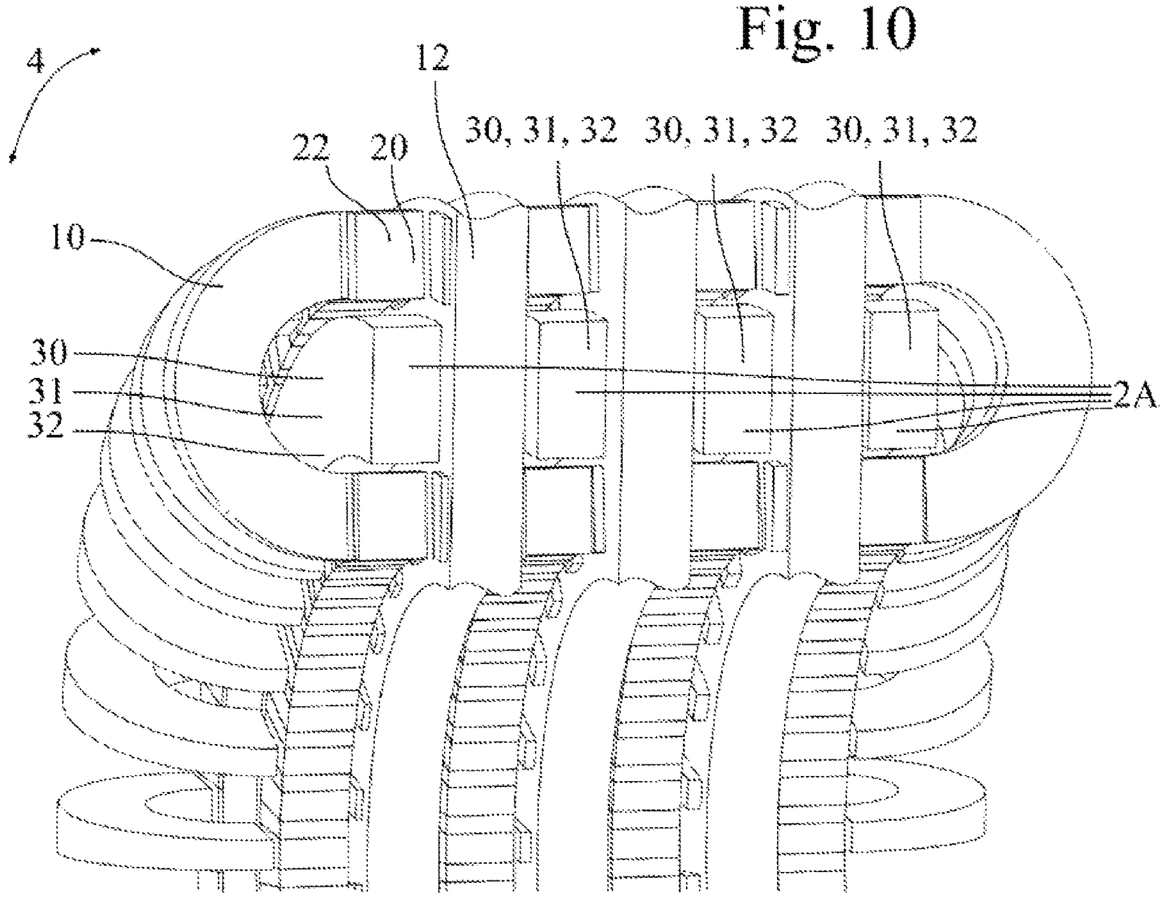

ELECTRICAL MACHINE WITH AN ISOLATED ROTOR

RELATED APPLICATION DATA

The present application is a National Phase of International Patent Application No. PCT/SE2021/050836, which was filed on Aug. 27, 2021, entitled "AN ELECTRICAL MACHINE WITH AN ISOLATED ROTOR" and claims priority to Sweden Patent Application No. 2051042-6 which was filed on Sep. 3, 2020. The contents of these applications are incorporated herein by reference in its entirety.

TECHNICAL FIELD

The present invention relates in general to electrical machines and in particular to modulated pole machines.

BACKGROUND

The concept of electrical machines is well known and the first types of electrical machines such as the induction machine and the synchronous machine that were invented in the late 19:th century are still very important in the industry today. Electric machines generally comprise one movable part, typically but not restricted to a rotor or a translator, and a second part, typically but not restricted to a stator. These parts are separated by an airgap, which separates the movable part and the second part. At least one of the parts, typically the stator, also has an electric winding which can carry an electric current.

Characterizing for electric machines is that they have low force or torque densities compared to mechanical systems such as gear boxes, hydraulic systems and pneumatic systems, but has high power densities since they can operate at high speed. A power density of 1 kW/kg is a representative number for an electric motor.

Characterizing for most electrical machines is also that the resistive power losses, which often constitute the majority of the losses in the electric machine, are independent on the airgap speed v if the eddy currents in the winding are neglected. However, counted in percent of the total power, the resistive power losses become proportional to 1/v since the total power is proportional to v. Thereby, general electric machines typically have high efficiencies at high speeds in the range 10-100 m/s, where efficiencies in the range of 90-98% are common. At low speeds, e.g. below 5 m/s, electrical machines typically have lower efficiencies.

Also, the resistive losses typically create a thermal problem in the electric machine, and limit the torque and force density as well as the power density for operations longer than a few seconds.

Due to the low force or torque density and poor low speed efficiency, electric machines are often used in combination with gear boxes, hydraulic systems or pneumatic systems in applications requiring high torque or force and low speed. This enables the electric machine to operate at high speed and low torque. These mechanical systems, however, have certain drawbacks. The mechanical conversion generates extra losses in the system, which are typically 3-20% depending on the system and even higher in partial load. The mechanical conversion system also requires maintenance to a larger extent than the electrical machine itself, which can increase the overall cost. As an example, for wind power, maintenance problems with the gear boxes have been a continuous large problem for the last 20 years.

To get around the low speed efficiency problem and the low force density problem, a number of different machine types belonging to the family of machines known as modulated pole machines (MPM) or variable reluctance machines (VRM), where variable reluctance permanent magnet machines (VRPM) is a further specialization, has been proposed and developed. These machine types, for example the Vernier machine (VM), the Vernier hybrid machine (VHM) and different variants of the transverse flux machines (TFM) implement a geometrical effect known as magnetic gearing, which lowers the winding resistance grossly by making the winding shorter and thicker. This is accomplished by arranging the geometry so that the flux from several adjacent poles gives a substantial net flux in the same direction and so that the flux from these poles switches direction when the movable part, i.e. translator or rotor, is moved one pole length.

These machines also develop a higher shear stress than other machines, where shear stress is defined as the useful shear force per unit airgap area. They, however, do not in general increase the amount of airgap area packed in per unit volume much compared to standard machines, so although the force density of these machines is increased, it is only moderately. A well-known problem with these machine types is that the leakage magnetic flux becomes large, and that the power factor becomes low at full load. Thereby, they cannot both have a high power factor and a very high shear stress. Although they have been proposed for wind power, they have not reached a wide-spread market penetration due to these drawbacks.

One type of TFM machine has been proposed in references [1-4]. This machine has the advantage that it does pack in considerable airgap area per unit volume. However, the machine looks like a transformer split in two and has the coils far away from the airgaps in up to two massive coils per phase. Unfortunately, this design also has some minor drawbacks. The proposed design gives a large magnetic leakage flux, which results in a low power factor. Also, it has a large clamping magnetic normal force that requires a strong mechanical structure to hold the core. This is due to the fact that coils are wound around two structures only, and that these two structures are located far away from some of the air gaps.

A problem with prior art electrical machines is that in low speed applications and in applications where high force or torque densities are required, the current solutions cannot reach very high torque or force densities, and the most torque dense machines have a low power factor at full load. This results in large and expensive direct drive machines which often have considerable losses.

SUMMARY

A general object of the presented technology is therefore to provide electrical machines having improved general torque or force density and increased low speed efficiency.

The above object is achieved by devices according to the independent claims. Preferred embodiments are defined in dependent claims.

In general words, in a first aspect, a rotating electrical machine being a modulated pole machine operating by switching of magnetic flux comprises a rotor, a stator and a winding. The winding comprises at least two phase windings. The rotor and stator comprise respective sections interleaved with each other via more than 4 air gaps which are parallel to a direction of rotation being the direction of movement of the rotor relative to the stator at the airgaps. At least 2 different sections, preferably at least 3 different sections and most preferably at least 4 different sections each comprise a winding loop from the same phase winding. At least one of the sections being part of the rotor is an isolated rotor section which comprises electrically non-conducting structure material.

In a second aspect, a system comprises an electrical machine according to the first aspect. The system is a renewable energy conversion system, a wind power plant, a tidal power plant, an ocean wave power plant, an electric ship propulsion system, a gearless motor, an electrical vehicle, a direct drive system, or a force dense actuator.

One advantage with the proposed technology is that it increases the force or torque density of the machine and increase its efficiency, especially at low speed. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which:

FIG. 9 is a schematic illustration of parts of an embodiment of rotor and stator structures and windings of a modulated pole machine having a poloidal flux with parts cut-away;

FIG. 10 is a schematic illustration of parts of another embodiment of a modulated pole machine having a poloidal flux and a toroidal winding, with parts cut-away;

DETAILED DESCRIPTION

Figure 1A:
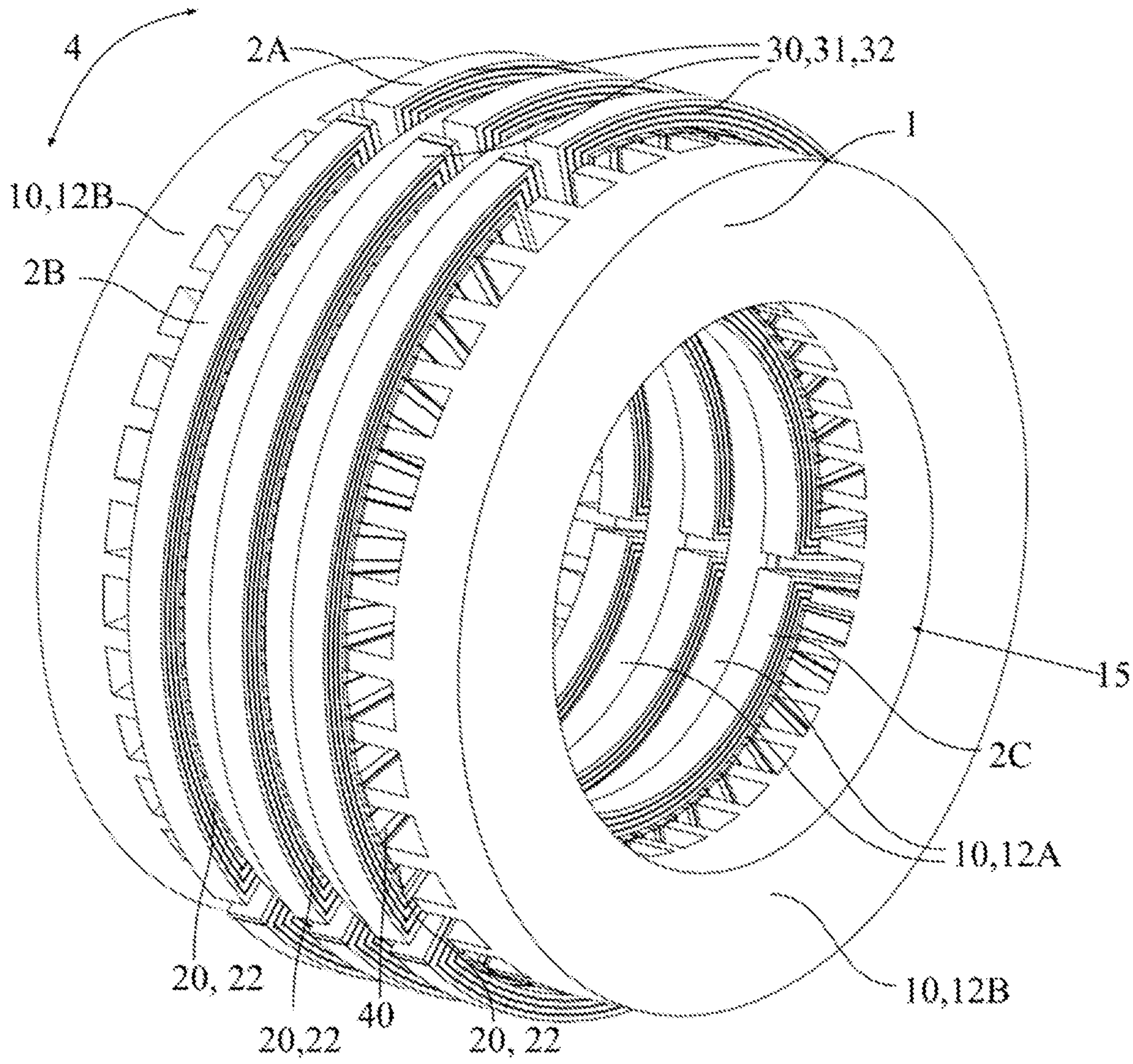
FIG. 1A is an illustration of an embodiment of a rotating electrical machine operating by switching of magnetic flux.

Throughout the drawings, the same reference numbers are used for similar or corresponding elements.

The technology presented here provides an elegant solution to both the general torque or force density problem of electric machines and the low speed efficiency problem by having extremely high torque or force density, very high efficiency even at low speed and by retaining a decent power factor. This is accomplished by preferably considering three different aspects. These concepts will in turn give the frames within which the design and the geometrical features have to follow.

The winding resistance is often a major drawback. To have a many times lower winding resistance, the technology presented here implements so-called magnetic gearing. This concept means that the winding is not wound between each individual pole but instead around many poles. Typically, a whole phase is encircled in a simple loop. Thereby, the winding can become several times shorter than for standard machines. At the same time, the winding can also be made several times thicker. This in turn makes the winding resistance many times smaller than for standard machines. The winding resistance can by such measures be reduced by a factor of around 1/100 to 1/5 depending on geometry and size. This also reduces the thermal problem grossly.

Another concept to consider is to increase the number of airgaps in an as small volume as possible. In other words, there is a strive to increase the total air gap area within a certain machine volume, since the force of the machine is developed in the air gap. The technology presented here implements a geometry that connects many airgaps in series magnetically, tightly packed together in a geometry that closely resembles a magnetically closed loop. This is preferably accomplished without having unnecessary long magnetic field line paths in blocks of magnetic material such as iron. The geometrical arrangements presented here accomplish this by reducing any passive return paths of magnetic material for the magnetic flux. Thereby, many times more air gap area can be packed in per unit volume in the machine presented here compared to standard electric machines. This is furthermore achieved without using excessive amount of permanent magnets.

Many embodiments of the invention comprise permanent magnets. Mostly, neodymium-iron-boron magnets are used due to their superior performance. Magnets containing neodymium, often just called neodymium magnets, have very high remanent flux density and large coercive force, giving electrical machines that are very force dense and efficient. However, these magnets contain rare earth elements, which are scarce and expensive. An alternative is to use ferrite magnets instead. The performance of these magnets is considerably worse in almost every aspect compared to neodymium-iron-boron magnets, but they do not comprise rare materials, they are of very low cost, they do not conduct electrical current which eliminates eddy current problems and they are not heat sensitive. Thereby, in some applications, it is beneficial to use ferrite magnets instead of neodymium-iron-boron magnets, especially in a flux-concentrating structure.

The high number of airgaps, in combination with the reduced resistance in the winding, also allows for a considerably higher current loading in the electric machine. This means that the shear stress, i.e. the useful force per unit area developed in the airgap, becomes 2-4 times as high as in standard machines. Even a force per unit area of up to 100 $kN/m^2$ is feasible. The gain in shear stress becomes even larger compared to standard machines when many airgaps are packed tightly together due to the magnetic gearing, since standard machines such as axial flux machines have an unfavorable scaling in this respect. This in combination with the considerable increase in airgap area per unit volume or weight gives the technology presented here a force or torque density that is many times larger than for standard machines, typically 5-25 times.

Another effect with this geometry is that it preferably can be arranged so that the normal forces on the magnetic materials at most airgaps can be eliminated locally, at least ideally, which reduces the need for heavy and bulky structure material considerably. Elimination of normal forces on the magnetic material is normally also performed in prior art electrical machines, but typically in a global sense. This therefore requires an internal structure that carries the normal force from one side of the machine to the other. However, the here presented normal force elimination in a local sense is strongly advantageous. The need for robust internal structures is grossly reduced by the technology presented here.

A further benefit for some of the preferred embodiments is elimination of leakage magnetic flux. By arranging phase windings in a distributed way in at least two but preferably more stator sections, the entire winding for one phase resembles a closed or nearly closed coil geometry. This geometry may be a racetrack coil or a similar shape. By having such a geometry, the leakage magnetic flux may be reduced considerably or almost be eliminated. The winding in these embodiments of the machine is to this end arranged in a way that almost eliminates the global leakage magnetic flux. Thereby, the power factor of the machine can be maintained at a reasonable level, without reducing the shear stress, and a power factor of 0.8 can be reached in preferred embodiments. Also, such geometrical relations reduce problems with eddy currents in the windings and in the mechanical structure, as well as planar eddy currents in electric steel sheets.

The present invention relates preferably to a type of electrical machine that utilizes geometrical effects to grossly increase the force or torque density of the machine and increase its efficiency, especially at low speed, and in preferred cases without compromising with the power factor. The technology presented here has unprecedented performance in low speed applications such as direct drive and in applications where high force or torque densities are required, but is not limited thereto. Suitable applications are wind power, tidal power and ocean wave power, i.e. renewable energy conversion systems, electric ship propulsion, electric vehicles, replacement of gear motors, direct drive applications and force dense actuators, but the invention is not limited thereto and can be used in many other applications as well.

Some terms used in the present disclosure may need a clear definition.

"Electric machines" is to be interpreted as machines that can exert a force on a movable body when an electric current is applied, or vice versa. Typically, the electric machine is used as a generator, a motor or an actuator.

The "airgap" or "air gap" is typically filled with air, but is not restricted thereto and can comprise any material that is non-magnetic such as gases, liquids, plastics, composite materials, plain bearing material such as Teflon etc.

"Non-magnetic" is here to be interpreted as a material that has a relative permeability of <50 at a magnetic flux density B of 0.2 Tesla and that have a remanent flux density of <0.2 Tesla. Further, "magnetic" is here to be interpreted as a material that has a relative permeability of >=50 at a magnetic flux density B of 0.2 Tesla or a remanent flux density of >=0.2 Tesla.

Mechanical power can be expressed as P=Fv, where F is the force and v is the speed.

"Speed" is here defined as the relative speed between the rotor and the stator. The speed is defined at the respective surfaces of these two parts at the airgap separating the two parts.

"Electrically non-conducting" is here to be interpreted as a material that has an electrical resistivity which is larger than 10^-5 Ohm*m at a temperature of 20 degrees Celsius.

"Electrically conducting" is here to be interpreted as a material that has an electrical resistivity which is smaller than or equal to 10^-5 Ohm*m at a temperature of 20 degrees Celsius.

"Structure material" is defined as any material or part of the machine which does not play a major active role in the magnetic circuit of the electrical machine or is an electrically conducting part of the winding.

"Force" is here defined as the relative force exerted by the electric current between the rotor and the stator. The forces are taken at the respective surfaces of these two parts at the airgap separating the two parts and along the movement so that it becomes a shear force at the surfaces.

"Normal force" is here defined as the attractive normal force at the airgap between the rotor and the stator.

"Magnetically highly permeable material" is in the present disclosure defined as materials having a relative magnetic permeability of more than 50 at a magnetic flux density of more than 0.2 Tesla.

The geometry of the technology presented here is arranged to implement magnetic gearing so that the magnetic flux is unidirectional or nearly unidirectional inside a simple winding loop. This winding loop is typically a rectangular-like winding loop enclosing magnetic flux over at least 3 magnetic poles of a same polarity, as discussed further below. Note that this is not the same as distributed windings in a synchronous electric machine, where the flux is not unidirectional.

Thereby, the invention belongs to a family of electrical machines that implement magnetic gearing, such as Vernier machines (VM), Vernier hybrid machines (VHM), transverse flux machines (TFM) and switched reluctance machines (SRM). A characteristic for these machines is that they have a toothed structure of magnetic material that modulates the magnetic field to switch back and forth during operation. This family of electrical machines are therefore often called modulated pole machines (MPM) in literature [5, 6], a term that will be used subsequently in this text. They are also sometimes referred to as variable reluctance (VR) or variable reluctance permanent magnet machines (VRPM) for the permanent magnet machines, which is in principle a broader term. These machines in general accomplishes the low resistance, but does not reach as high force or torque densities as the invention since they do not connect many airgaps magnetically in series, and thereby do not pack in the large airgap area per unit volume as the invention does but up to several times less. Also, these machines do not avoid magnetic leakage fluxes to the same extent as the invention, and thereby has more problems with eddy currents and a lower power factor. These machines also do not cancel out the magnetic normal forces in a local sense to the same extent as the technology presented here. Thereby they require more structure material for the same amount of torque, which makes them heavier and more expensive.

The axial flux synchronous electric machine (AFM) is a well-known synchronous machine with the magnetic flux arranged in the axial direction. In a few cases, it has been suggested that axial flux machines could operate with many airgaps magnetically connected in series which can increase its torque density. The AFM does not, however, have nearly as low winding resistance as the invention since it does not implement magnetic gearing, and cannot therefore reach both high efficiency and high torque density since it cannot produce the same shear stress in the air gap. Further, the AFM cannot pack in as much airgap area per unit volume as the invention, since the winding resistance for the AFM has an unfavorable scaling compared to the invention when the magnetic poles are made shorter. These described features give the invention considerably better performance in terms of combined efficiency and force or torque density than any electric machine that does not implement magnetic gearing, including iron-cored and air-cored synchronous electric machines with or without permanent magnets, induction machines and synchronous reluctance machines, or a combination thereof.

The usual type of synchronous electrical machines, which do not implement magnetic gearing, use either concentrated or distributed windings. For concentrated windings, each winding turn is normally wound around the magnetic flux from one pole only, or with a wave-like winding which goes back and forth crossing the airgap and enclosing flux from every other magnetic pole to enclose the poles of the same polarity. In a synchronous machine with distributed windings, the windings from different phases overlap to produce a reasonably functioning machine, which causes large end windings and causes windings to cross each other. Even though a loop of a distributed winding encircles flux from many magnetic poles, it never encloses a total magnetic flux that is larger than the flux from one individual pole. This is since the surplus of number of enclosed poles of one polarity compared to number of poles of the other polarity is never greater than one. A characteristic of the technology presented here is that the winding encircles an encircled magnetic structure which carries magnetic flux from a multitude of magnetic poles with a simple winding loop, preferably enclosing magnetic flux from 5 adjacent poles or more. Due to the magnetic gearing, the net flux through the winding is larger than the flux from one individual pole or preferably larger than twice the flux from one individual pole. In other words, a total magnetic flux is larger than the magnetic flux from 2 individual magnetic poles of a same polarity. This is since the modulated pole geometry that gives magnetic gearing weakens the flux from poles of one polarity and increases the flux from poles of the other polarity, which gives a large net flux. If a geometry is selected where the net flux through the winding loop is smaller than the flux from one individual pole, there is little value in implementing magnetic gearing.

Another characteristic for the technology presented here is that the winding is considerably shorter for a certain induced voltage than for standard machines. In an ordinary electric machine which does not implement magnetic gearing and does not have a distributed winding, the winding in a winding loop crosses the airgap area perpendicular to the direction of rotation twice as many times as the number of poles of the same polarity n that the winding encloses. This is since the winding must wrap around each pole individually, to avoid catching the flux of opposite polarity in the adjacent poles. Since there are also end windings, the length of the winding loop is always longer than 2*n*d where d is the average width of the magnetically active part of the airgap taken in a direction parallel to the airgaps and perpendicular to the direction of rotation. To have any reasonable gain in using magnetic gearing, the winding should be shorter than this, i.e. shorter than 2*n*d, and preferably considerably shorter than n*d. Thereby, a characteristic of magnetic gearing is that the winding loop encloses magnetic flux from n magnetic poles of the same polarity where n is larger than 2, preferably n is larger than 4 and more preferably n is larger than 6, and the winding loop encloses a total magnetic flux being larger than the flux from one individual magnetic pole, preferably being larger than the flux from two times the magnetic flux from one individual magnetic pole, where the winding loop length is shorter than 2*n*d, preferably shorter than n*d, where the airgap width distance d is the average width of the magnetically active part of the airgaps taken in a direction parallel to said airgaps and perpendicular to the direction of rotation, where the magnetic poles are provided in at least one of the rotor and the stator. A further characteristic of the technology given here is that the different phases of the electrical machine and the winding are localized in different parts of the machine, more or less forming a number of one-phase machines which are mechanically connected. This also means that the windings from different phases generally do not overlap, i.e. the magnetic poles that are enclosed by a winding loop from one phase winding are preferably not enclosed by a winding loop belonging to another phase. This is different from synchronous machines with distributed windings, where the phases are normally intertwined. There can of course be some overlap anyway, so that the windings from different phases partially overlap. This reduces the efficiency and force density, and complicates the construction, but could serve a purpose in reducing the cogging torque. It is currently believed that at least 30% of the flux from the poles enclosed by one phase winding loop should be external to any other winding loops belonging to other phases. In other words, at least 30% of the flux from the poles enclosed by one phase winding loop should not be enclosed by any other winding loops belonging to other phases. To be more precise, the invention is characterized by that at least one winding loop, being a first winding loop, encloses magnetic flux from at least 5 magnetic poles where at least 30%, preferably at least 50%, more preferably at least 70% even more preferably at least 90% and most preferably 100% of the flux from the at least 5 magnetic poles are external to all other winding loops belonging to another phase and located in the same section as the first winding loop.

Note, however, that the flux from a magnetic pole in one section may also pass the same section at another place at other poles, since the magnetic flux forms closed loops in the embodiments relevant for the invention. The interpretation of the flux from the at least 5 magnetic poles shall in this context mean the flux at the airgap at the very poles, not at other poles where the flux may have its return path.

The rotor of an electrical machine is normally made of metal, being an electrically conducting material. Metal has many benefits, such as high mechanical strength and stiffness and resistance to mechanical cold flow. However, there is also a risk that eddy currents and circulating currents in the structure of the rotor cause power losses and reduces the efficiency of the machine. For the invention, this problem is more pronounced since it is a flux-switching machine which typically has a rather short pole length and thereby a high electrical frequency compared to the speed at the airgap. It is therefore beneficial that the rotor comprises electrically isolating material in the structure, which can be used to avoid or reduce circulating currents and eddy currents in the structure. The rotor can be made almost entirely of an electrically isolating material, but it can also have only smaller parts of electrically isolating material strategically placed near the airgaps. In other words, it is beneficial if at least one of the sections being part of the rotor is an isolated rotor section which comprises electrically non-conducting structure material. To avoid circulating currents in the structure, it is preferable if at least one, preferably all, closed loops of structure material which encircles permeable material at the airgap in at least one rotor section has an electrical resistance larger than 0.05 Ohms.

A phase winding should be interpreted as the entire winding that belong to the same phase, regardless of if the winding is separated into several windings connected in parallel, or even separated into several windings that are connected to different converters. Also, when determining if windings in different stator sections belong to the same phase, they should be regarded as belonging to the same phase even if the voltage in the windings are displaced a few electrical degrees relative to each other, since the magnetic field then anyhow can be connected in series for at least two stator sections. A pragmatic limit can here be set do a difference of 30 electrical degrees, although a configuration having close to 0 or 0 electrical degrees difference is preferred.

FIG. 1A illustrates an embodiment of an electrical machine 1 operating by switching of magnetic flux, where the magnetic flux is predominantly in the axial direction. This embodiment is a three-phase machine, where the different phases 2A, 2B and 2C are positioned after each other along the direction of rotation 4. Thereby in this embodiment, the winding 30 comprises at least two phase windings 31. Each phase operates in principle independent of each other although in this embodiment the flux from one phase has a return path in the two other phases. The phase structures are connected mechanically to each other, providing a fairly smooth total force with reasonable cogging. The electrical machine 1 comprises a rotor 10, in this embodiment divided into four rotor sections 12, two inner rotor sections 12A and two end cap sections 12B. The electrical machine 1 further comprises a winding 30, having a number of loops 32. In this embodiment inside the loops 32, there is an encircled magnetic structure which is securely fixed to the winding. The winding loops 32 encircles at least 5 adjacent magnetic poles, in this particular embodiment 26 adjacent magnetic poles, and encircles considerably more flux than the flux from 1 or even 2 individual poles due to the magnetic gearing effect. The stator 20 is in this embodiment divided in three stator sections 22, each having a winding loop from the same phase winding. In other words, a winding from the same phase is present in all stator sections 22. Mechanical structure parts are removed in order to enable the view of the rotor and stator 10, 20 and the winding 30.

A "section" is in this disclosure referring to a mechanical component that in each part has an extension in a first and a second direction, different from the first direction, that is considerably larger, typically at least one order of magnitude, than an extension in a third direction, perpendicular to the first and second directions. This third direction is also referred to as an axial direction 15, associated with the sections. The section is thus in most cases essentially flat, when viewed as a whole, although it can be curved, typically to a circle-section shape, or slightly wedge-shaped in some embodiments. However, the surface of the section may comprise non-flat components, such as protruding parts or recesses. As described further below, the section can also be composed by different parts and/or materials.

The rotor and stator sections 12, 22 of the rotor and stator 10, 20 are placed facing each other via air gaps 40. The air gaps 40 are parallel to the direction of rotation 4, i.e. magnetic flux passing the air gaps is essentially perpendicular to the direction of rotation 4. The rotor 10 and stator 20 have, along the axial direction 15, respective rotor and stator sections 12, 22 interleaved with each other via the air gaps 40. In other words, when passing along the axial direction, a rotor section 12 of the rotor 10 is followed by a stator section 22 of the stator 20, separated by an air gap 40, except at one side of the end cap sections 12B. Likewise, when passing along the axial direction, a stator section 22 of the stator 20 is followed by a rotor section 12 of the rotor 10, separated by an air gap 40. There is thus an inner rotor section 12A of the rotor 10 between each pair of adjacent stator sections 22 of the stator, and analogously a stator section 22 of the stator 20 between each pair of adjacent rotor sections 12 of the rotor 10. The outer rotor sections or end caps 12B are placed at the axial ends of the machine, and closes the magnetic circuit.

Each inner rotor section and stator section 12A, 22 can thus be defined as the part of rotor and stator 10, 20 that is situated between rotor and stator section surfaces facing two consecutive ones of the air gaps 40, along the axial direction. The outer rotor sections 12B can be defined as the axially outermost rotor sections facing one outermost airgap and having no other rotor sections on the same side of that outermost airgap.

Figure 1B:
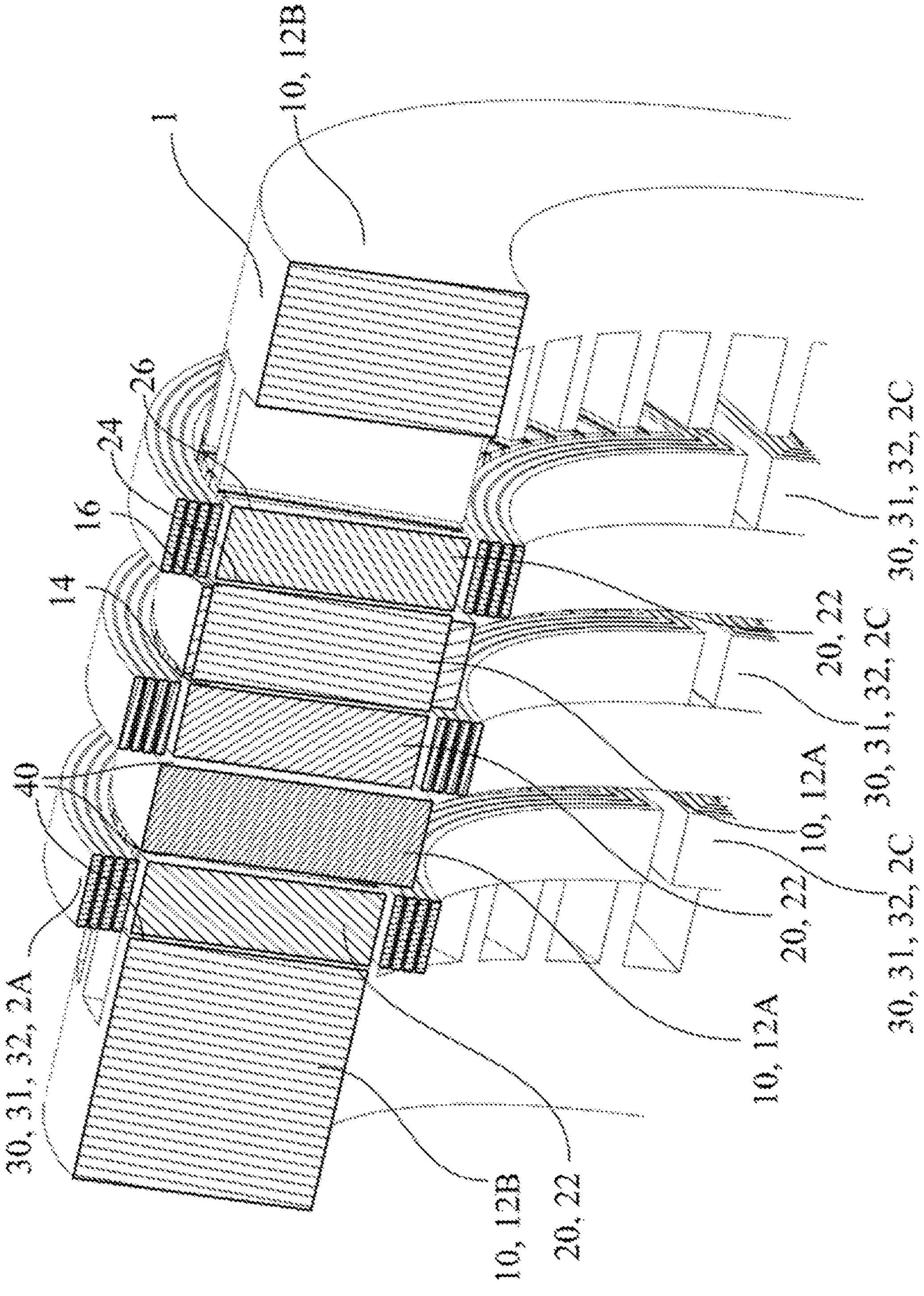
FIG. 1B is a cross section view of the embodiment of FIG. 1A.

In FIG. 1B, an illustration of a cross section of the electrical machine 1 of FIG. 1A is shown. Here, the rotor sections 12 and the stator sections 22 more clearly shown. Here it can be seen that the stator sections 22 of the stator 20 are situated between stator section surfaces 24, 26 facing two consecutive ones of the air gaps 40, along the axial direction. Also, inner rotor sections 12A of the rotor 10 are situated between rotor section surfaces 14, 16 facing two consecutive ones of the air gaps 40, along the axial direction. Outer rotor sections or end caps 12B are located at the axial end of the machine on one side of an airgap where all other rotor and stator sections are located on the other side of that airgap.

Furthermore, for each inner rotor and stator section 12A, 22 of the rotor and stator 10, 20, magnetic field lines go through magnetic material between the rotor and stator section surfaces 14, 16, 24, 26. This means that many air gaps 40, in this embodiment 6, are connected magnetically in series. The magnetic loop is closed by the end caps, the outer rotor sections 12B. The air gaps 40 are relatively tightly packed together, and there are no very long magnetic field line paths in blocks of magnetic material.

These properties can be even further enhanced by further increasing the number of interleaved rotor and stator sections, thereby increasing the number of airgaps. Presently, it is considered that there has to be more than 4 airgaps in order to achieve noticeable advantages. More pronounced advantages are achieved using more than 6 airgaps. Even more preferably, more than 8 airgaps are provided and to get a truly force dense or torque dense machine more than 10 airgaps are preferably provided. Two of these sections are typically end sections being either rotor sections or stator sections and the end sections do not have airgaps on two sides but only one side and closes the magnetic circuit of the electrical machine.

In this embodiment, permanent magnets are present. Thereby, it is a modulated pole machine comprising permanent magnets which operates by switching of magnetic flux.

In this embodiment, there are three phases in each stator section 22, and thereby winding loops from three phases. It is preferable for mechanical reasons to have a force that only slightly varies with position in a stator and rotor section, since problems with vibrations and fatigue may otherwise occur. To achieve this, more than one phase is required in the section. It is strongly advisable to have more than 2 phases in a section, since the sum of the magnetic flux in all phases can then be ideally zero while maintaining a smooth force. However, the more phases that are present in a section, the smoother the force will be, and more than 3 phases can be beneficial if the space claims and extra cost generated by having additional phases do not cancel out the gain. For larger machines, more than 6 phases could be beneficial, for very large machines more than 9 phases could be the best option and for gargantuan machines such as large wind power generators more than 12 phases will give an even better force profile.

The reduction of force fluctuations in one stator section, also applies to the machine as a whole. Thereby, if the electrical machine has more than 3 phases, a smoother total force can be achieved and even more so if more than 6 phases are applied. For a large machine, more than 9 phases can be beneficial in this respect, and for an even larger machine more than 12 or even more than 15 phases could be used to give a very low cogging force. Having many phases also opens up the possibility to shut down individual phases when a fault occurs, and still use the other phases. A high number of phases may therefore provide the machine a fault resistive property.

As can be seen in FIGS. 1A and 1B, there is also a varying structure of the rotor and stator sections 12, 22 along the direction of rotation 4. This will be discussed more in detail in connection to FIGS. 1C-F.

Figure 1C:
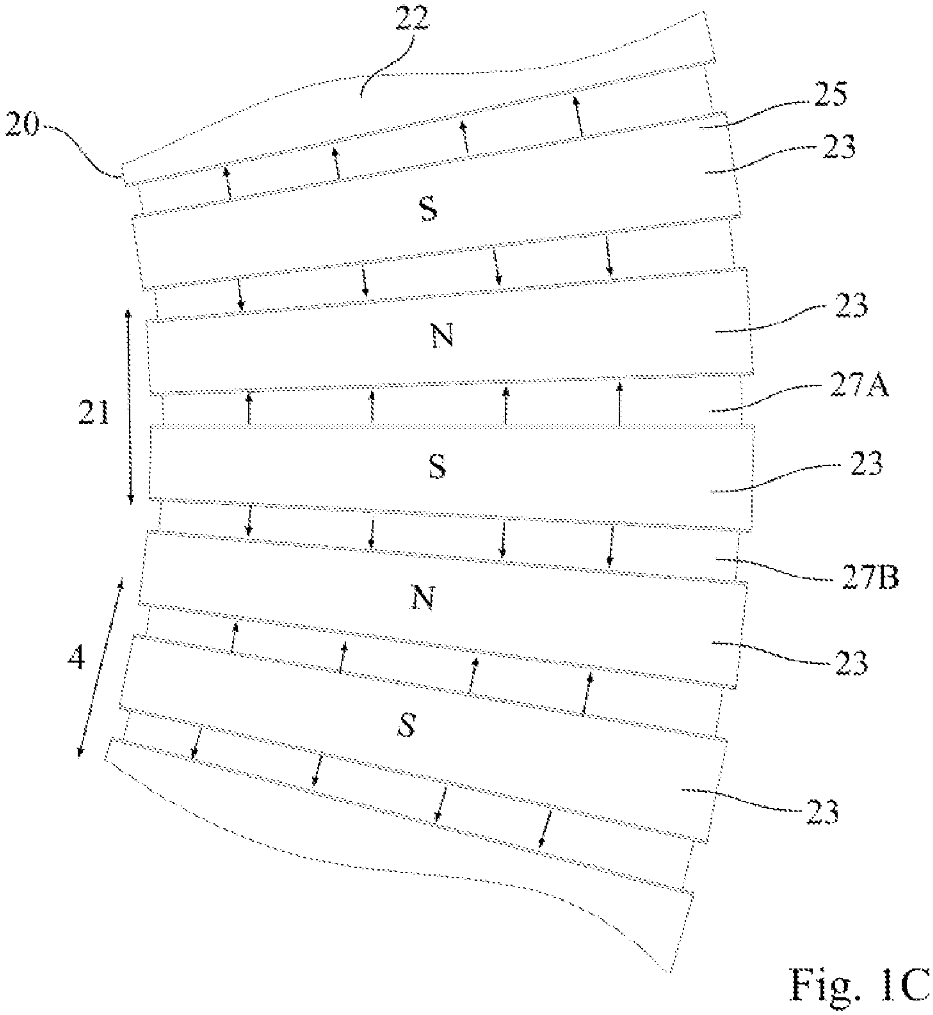
FIGS. 1C-D are schematic illustrations of an embodiment of a stator.

In FIG. 1C, a part of one of the stator section surfaces 24 of one embodiment is illustrated as seen from an air gap. The stator section 22 of the stator 20 comprises in this embodiment a stack of permanent magnets 27A, 27B, interleaved with blocks of electrical steel sheets 25 or any other magnetically highly permeable material referred to as stator portions of magnetically highly permeable material 23. The notation "stator" is used since the portions are provided within the stator 20. The electrical steel sheets 25 typically prohibits eddy currents. The stator portions of magnetically highly permeable material 23 conduct the magnetic field well, and since the permanent magnets are positioned with alternating polarity in the direction of rotation 4, every second one of the stator portions of magnetically highly permeable material 23 will present a magnetic north pole N and the others will present a magnetic south pole S. The stator portions of magnetically highly permeable material 23 will act as magnetic flux concentrating structures. Thus, in this embodiment, in the direction of rotation 4 at each air gap, the stator 20 presents permanent magnet poles N, S.

The permanent magnets in the embodiment above are thus arranged in a flux-concentrating setup. In a flux-concentrating setup, the flux from the permanent magnets is conducted by e.g. magnetically highly permeable materials into a narrow geometrical structure, narrower than the poles of the permanent magnets themselves. This thus results in that the flux in such a narrow structure becomes higher than the flux directly at the permanent magnet poles. The exact form of such structures is preferably to be decided for each design, as a person skilled in the art is aware of.

Electrical steel is normally produced with a non-adhesive coating, and the individual sheets are stacked and held together by different fastening methods. However, since the present ideas contain many small parts, it may here be of benefit to use electrical steel with adhesive coating. Then, an automatic stamping machine can produce pre-glued blocks of desired shapes, which simplifies the assembly and makes the electrical machine more rigid.

Another magnetically highly permeable material that can be used as blocks interleaved with the permanent magnets, or in other designs described using electrical steel sheets as discussed further below, are e.g. soft magnetic composites (SMC). These materials comprise iron particles having electrically isolating coatings, sintered into a final shape. This differ from electrical steel sheets, which are normally stamped with a die or laser cut, and then stacked. SMC may conduct magnetic fluxes in all directions without exhibiting any eddy currents of significance but has higher hysteresis losses than electrical steel sheets.

An average distance 21 between consecutive magnetic poles of a same polarity of the stator 20 is illustrated by a double arrow. In this particular embodiment, all distances between consecutive magnetic poles of a same polarity is the same, and is then also the same as the average thereof. However, in alternative embodiments, the permanent magnets may be provided somewhat displaced, which means that the distance between consecutive magnetic poles of a same polarity may vary somewhat, however, there is always an average.

Figure 1E:
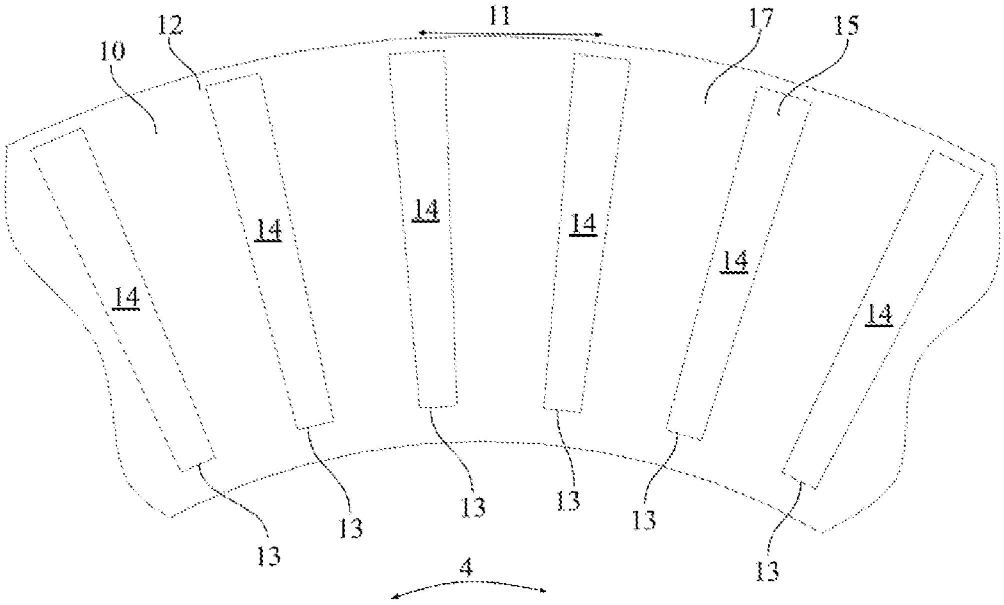
FIGS. 1E-F are schematic illustrations of an embodiment of a rotor.
Figure 1F:
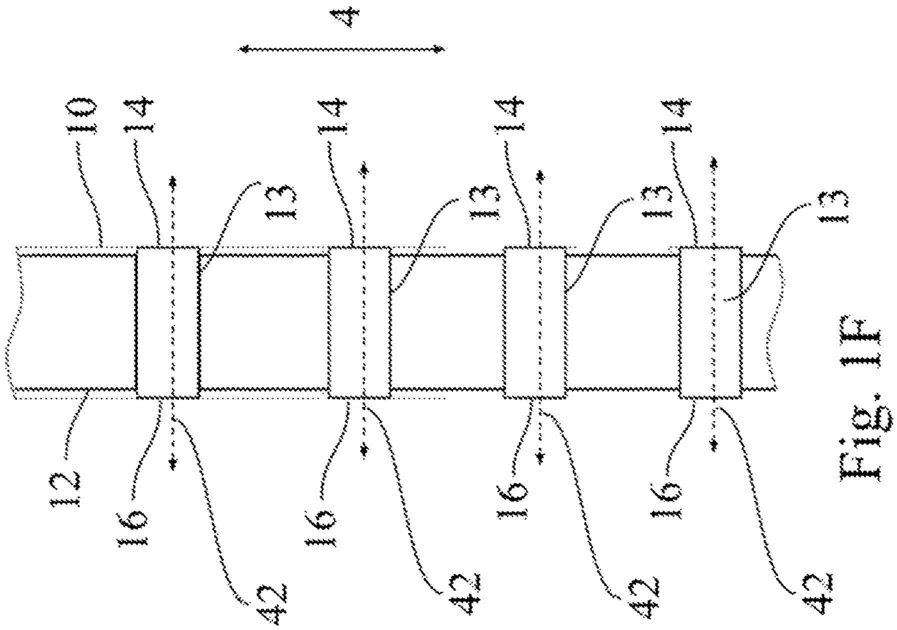
Figure 1D:
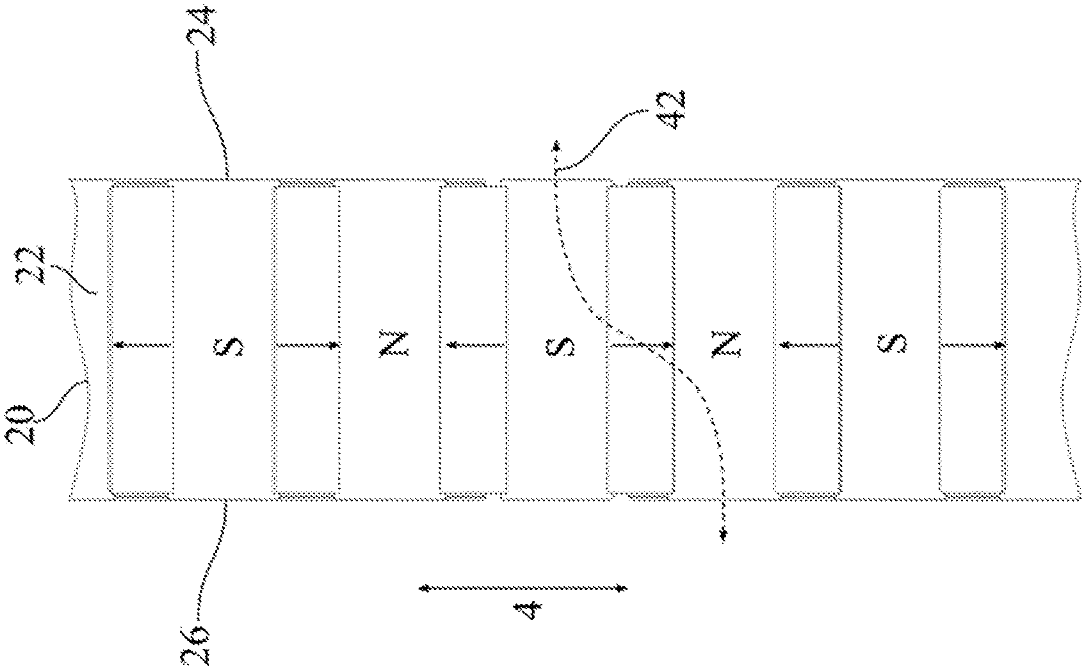

In FIG. 1D, the same part of the stator section 22 as in FIG. 1C is illustrated in a radial direction. Here, the stator section surface 24 and 26 can be easily seen. The indicated path 42 illustrates one example of how magnetic field lines may go through magnetic material, comprising the permanent magnets 27A, 27B and the stator portions of magnetically highly permeable material 23, between the stator section surfaces 24, 26. The stator section surfaces 24 and 26 are in other words magnetically connected to each other.

Thus, in one embodiment, at least one of the stator sections 22 of the stator 20 comprises permanent magnets 27A, 27B, arranged to present alternating poles along the surfaces 24, 26 facing the air gaps.

In a further embodiment, each stator section 22 of the stator 20 that comprises permanent magnets 27A, 27B comprises stacks, in the direction of rotation 4. The stacks comprise permanent magnets 27A, 27B with alternating magnetization directions parallel to the direction of rotation 4, separated by stator portions of magnetically highly permeable material 23, i.e. here the blocks of electrical steel sheets 25. Thereby, the stator periodicity, i.e. average distance 21, equals the distance between every second permanent magnet.

In FIG. 1E, a part of one of the rotor section surfaces 14 is illustrated as seen from an air gap. The rotor section 12 of the rotor 10 comprises a stack of blocks of electrical steel sheets 15, or other magnetically highly permeable material, interleaved with distance blocks 17. The blocks of electrical steel sheets 15 conduct the magnetic field well, thus presenting a high magnetic permeability at the section surface 14. However, the distance blocks 17 are either, as in this embodiment, provided at a distance from the air gap, or are made by a non-magnetic material. Therefore, the distance blocks 17 present a low magnetic permeability at the rotor section surface 14, i.e. facing the air gap. Thus, in the direction of rotation 4 at each air gap, the rotor 10 presents a variable magnetic permeability.

In this embodiment, each rotor section 12 of the rotor 10 comprises stacks comprising rotor portions of magnetically highly permeable material 13, in this case the blocks of electrical steel sheets 15. The rotor portions of magnetically highly permeable material 13 have a main extension perpendicular to the direction of rotation 4. The rotor portions of magnetically highly permeable material 13 are separated by non-magnetic material or slits, i.e. the distance blocks 17 or the absence of material. Thereby, the rotor periodicity equals the distance between two consecutive rotor portions of magnetically highly permeable material 13.

An average distance 11 between consecutive maxima of the variable magnetic permeability of the rotor 10 is illustrated by a double arrow. In this particular embodiment, all distances between consecutive maxima of the variable magnetic permeability of the rotor 10 is the same, and is then also the same as the average thereof. However, in alternative embodiments, the rotor portions of magnetically highly permeable material 13 may be provided somewhat displaced, which means that the distance between maxima of the variable magnetic permeability of the rotor 10 may vary somewhat, however, there is always an average.

In FIG. 1F, the same part of the rotor section 12 as in FIG. 1E is illustrated in a direction parallel to the airgap and perpendicular to the direction of rotation 4. Here, the rotor section surface 14 and 16 can be easily seen. The indicated path 42 illustrates one example of how magnetic field lines may go through magnetic material, comprising the rotor portions of magnetically highly permeable material 13 between the rotor section surfaces 14, 16. The rotor section surfaces 14 and 16 are in other words magnetically connected to each other.

Figure 1G:
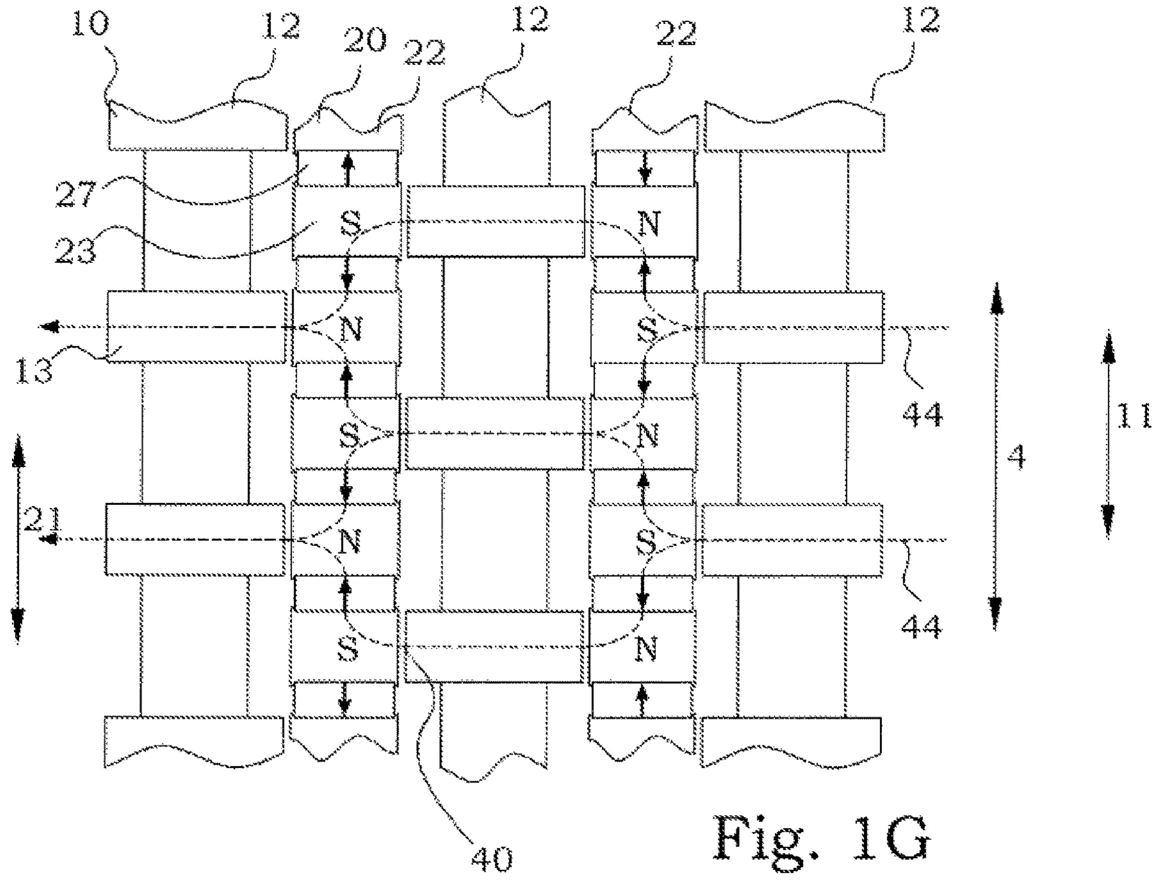
FIGS. 1G-H are schematic illustrations of embodiments of geometrical and magnetic relationships between magnetic structures in the rotor and stator.

The relation between the rotor and the stator is also of importance. FIG. 1G illustrates schematically some rotor and stator sections 12, 22 of the rotor 10 and the stator 20 along a part of a path perpendicular to the direction of rotation 4. Here the alternating appearance of the rotor sections 12 of the rotor 10 and the stator sections 22 of the stator 20 are easily seen. The air gaps 40 separate the rotor and stator sections 12, 22 from each other. Here, it can also be seen that the magnetic parts of the rotor sections 12 of the rotor 10 are able to conduct the magnetic field from the magnetic poles of the stator sections 22 of the stator 20. A magnetic flux can thus be conducted, mainly along the dotted arrows 44. It can here be noted that the illustrated magnetic flux passes each air gap 40 in a same direction, i.e. to the left in the figure.

Figure 1H:
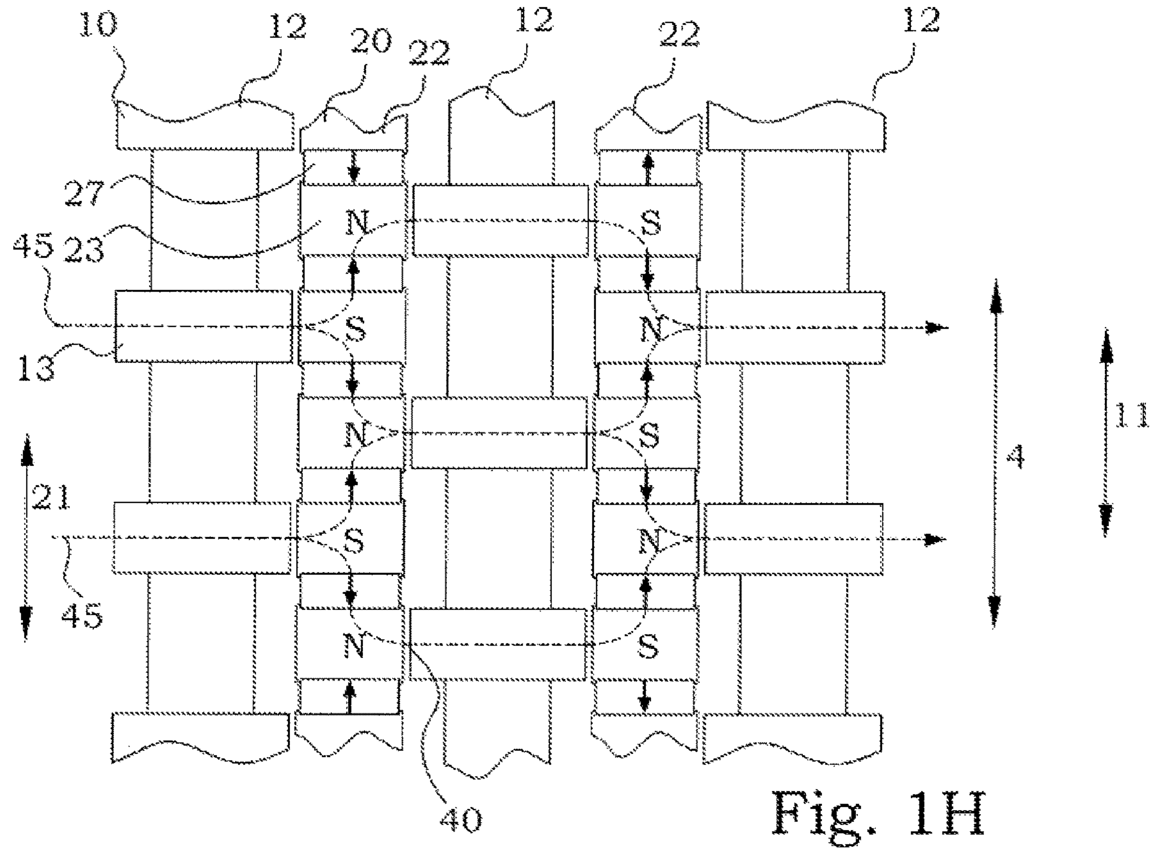

FIG. 1H illustrates schematically the rotor and stator sections 12, 22 of the rotor 10 and the stator 20 of FIG. 1G when the rotor 10 and the stator 20 have been displaced relative each other in the direction of rotation 4 by a distance equal to half the average distance 11. The situation for the magnetic flux is now completely changed. Now, the path for the magnetic flux is in the right direction of the Figure, as illustrated by the dotted arrows 45. In each air gap 40, the magnetic flux has now changed its direction.

It can be noticed in FIGS. 1G and 1H that the effect of having a magnetic flux in the same direction over all air gaps at each instant is achieved by adapting the distance 11, of the rotor 10 to be equal to the distance 21 of the stator 20. In order to achieve a maximum change in magnetic flux, these average distances should be the same. However, one may deviate from this demand, sacrificing a part of the shear stress and efficiency, and still have an operational machine. There are e.g. possibilities to provided minor deviations in average distances e.g. to reduce force fluctuations and so-called cogging effects, to reduce vibrations and to facilitate the start of a motor. It is also possible to use so-called skewing, where the magnetic materials in either the rotor 10 or the stator 20 is skewed so that they present an angle relative each other in the direction of rotation 4.

Figure 2A:
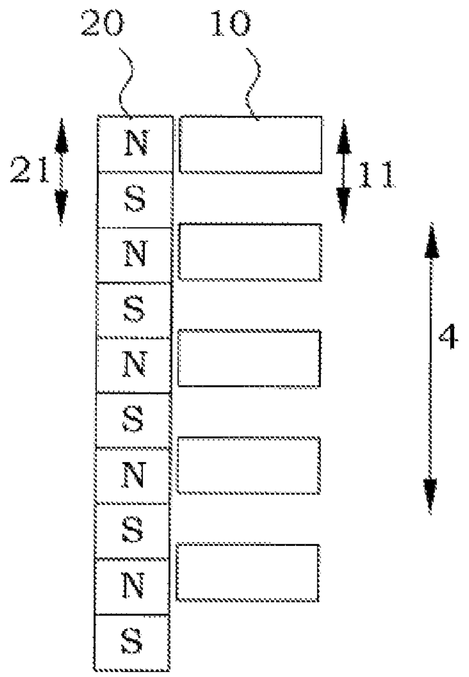
FIGS. 2A-D are schematic illustrations of embodiments of geometrical relationships between the rotor and the stator.
Figure 2B:
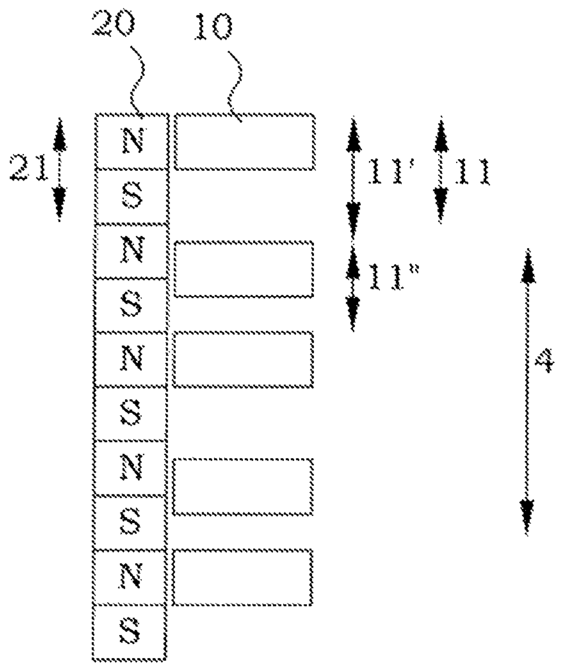
Figure 2C:
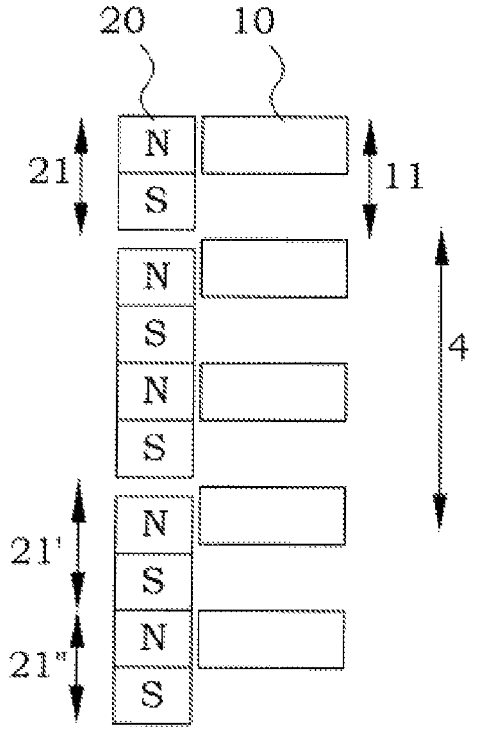
Figure 2D:
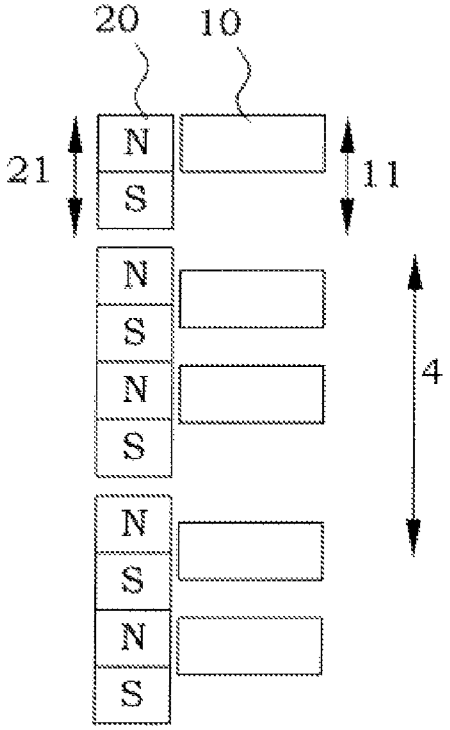

In FIGS. 2A-D, some embodiments of rotors 10 and stators 20 having differing periodicities in the direction of rotation 4 are schematically illustrated. In FIG. 2A, the periodicity of the rotor 10, represented by the average distance 11, is slightly different from the periodicity of the stator 20, represented by the average distance 21. However, the difference is still small enough to achieve a total constructive operation. In FIG. 2B, the average periodicity is the same for both the rotor and the stator, however, the rotor 10 have differing individual distances 11' and 11" between consecutive structure repetitions. In FIG. 2C, it is instead the stator 20 having differing individual distances 21' and 21". In FIG. 2D, both the rotor and the stator 10, 20 have differing individual distances between their respective structural repetitions, and have even a small difference in average distances 11, 21. Other configurations are of course also possible.

Due to the curvature, magnetic structures on an outer side, with respect to the curvature, may have different average distances, 11, 21, as will be discussed further below. However, for each section of the rotor, there is always a neighboring section of the stator, presenting average distances falling within the limits discussed here above.

It is presently believed that such deviations in average distances should not exceed 35%. In other words, the rotor average distance determined as an average distance between consecutive maxima of the variable magnetic permeability of a rotor section 12 of the rotor 10 is equal, within 35%, to the stator average distance determined as an average distance between consecutive magnetic poles of a same polarity of a neighboring stator section. Preferably, the average distance should be kept as close to each other as possible. Therefore, in a preferred embodiment, deviations between the average distances of the rotor and stator should not exceed 30%, more preferably not exceed 20% and most preferably not exceed 10%.

When defining the maxima of the variable magnetic permeability, it is the overall variations of the repetitive structure that is intended to be considered. Minor microscopic fluctuations that might give rise to small local maxima, not influencing the general energy conversion in the air gap outside are not to be considered as maxima in this respect. Likewise, other minor structures giving fluctuations of the magnetic permeability of a small extension and that does not contribute to the energy conversion in the air gap outside are to be neglected. It is believed that local maxima having a width that is smaller than 20% of the width of a widest main maxima, are of minor importance for the operation of the machine and should be neglected when defining the average distance between maxima.

Likewise, if the periodicity is disrupted by a missing main maximum, and the distance between consecutive main maxima then becomes the double distance, the operation properties will degrade somewhat, but will in most cases still be useful. Such omitted maxima in an otherwise repetitive structure should also be neglected when defining the average distance between maxima.

The presently disclosed technology is therefore based on the basic principle of a magnetic flux over an air gap that changes magnitude and direction depending on a relative position between two magnetic structures, the rotor and the stator. In an ideal case, neglecting unwanted leak flux, all magnetic flux over an air gap is directed in the same direction at the direct position. The machine is thus a machine that utilizes flux switching. In the present disclosure, a machine that utilizes flux switching is defined as an electrical machine operating by switching of magnetic flux and thereby implements so-called magnetic gearing.

In an ideal world, all magnetic flux passes the air gaps 40 into the opposite section, when the rotor portions of magnetically highly permeable material 13 of the rotor 10 are aligned with the stator portions of magnetically highly permeable material 23 of the stator 20. However, in the real world, there are always leakage magnetic fluxes present. Some magnetic flux will therefore always leak back over the air gap 40 again in the opposite direction. However, by a careful design, the majority of the magnetic flux will be directed in the same direction, at least when the magnetic structures are aligned. The efficiency, shear stress and power factor of the technology presented here will in general increase if this majority is increased.

Figure 3:
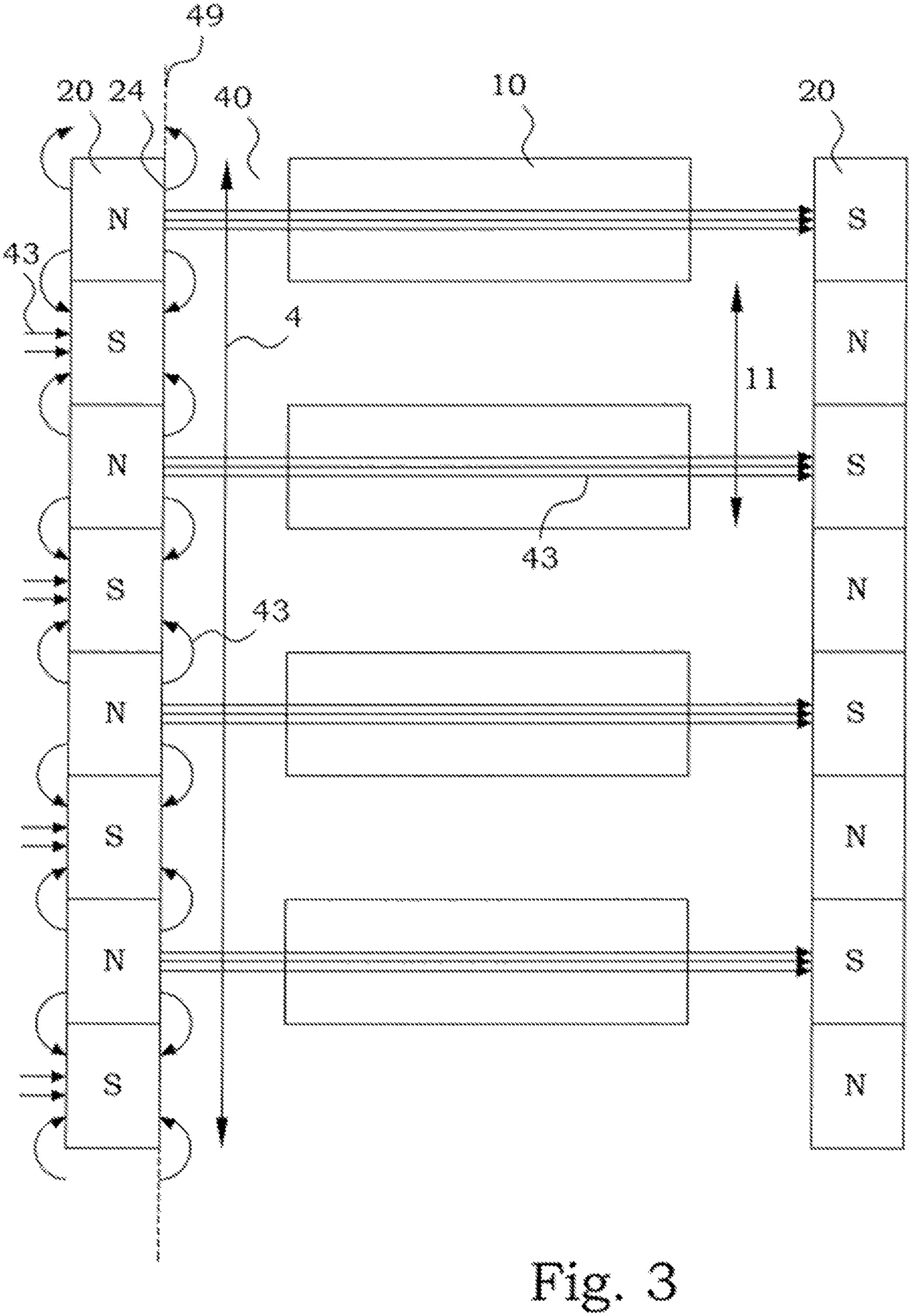
FIG. 3 is a schematic illustration of magnetic flux in airgaps.

FIG. 3 illustrates these definitions schematically. A stator 20 presents alternating magnetic poles along a surface 24 facing an air gap 40. Magnetic flux passing from the north poles to the south poles is illustrated by arrows 43. Some, preferably most of the, magnetic flux passes via a rotor section to a next stator section or turns back and through another part of the stator section if the rotor section is an outer rotor section. This is the magnetic flux that is utilized in the here presented technology for achieving the operation of the machine, i.e. the useful magnetic flux. Note that the air gap 40 in this illustration is dramatically exaggerated in order to increase the readability of the figure. However, some magnetic flux leaks back to the same stator section without passing any rotor section. If the situation at or close to the surface 24 is considered, indicated by the dashed line 49, magnetic flux passes outwards, i.e. to the right in the figure. In the present situation, five arrows 43 leave each north pole of the stator section, crossing the line 49. At the same time, magnetic flux also passes inwards, i.e. to the left in the figure. In the present situation, two arrows 43 reaches each south pole of the stator section, crossing the line 49.

As mentioned briefly above, the normal forces on the magnetic materials at the airgap can be eliminated locally, except on the end cap sections. The force on the stator section from the rotor section from one side is ideally compensated by an equal force from the rotor section on the opposite side. Similarly, the force on the inner rotor section from the stator section from one side is compensated by an equal force from the stator section on the opposite side. The forces thus balances, which reduces the need for heavy and bulky structure material considerably. In the real world, deviations from the perfect geometry will always be present, and those deviations will generate normal forces that do not cancel, according to Earnshaw's theorem. These forces are, however, of much smaller magnitude and are typically handled by a bearing system that positions the stator and rotor sections. The here presented normal force elimination in a local sense, has not earlier been used in this way for this type of machine.

Figure 4:
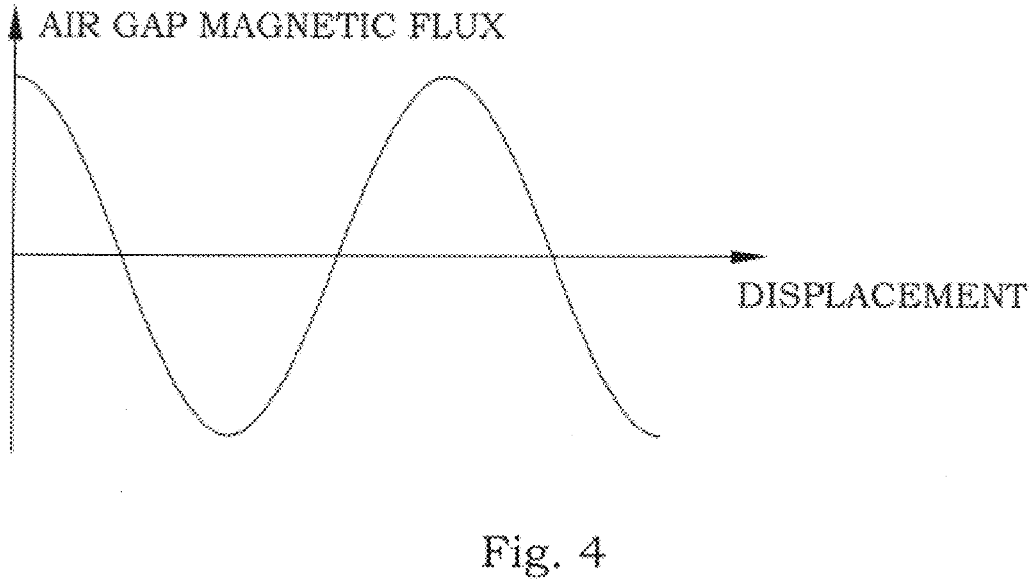
FIG. 4 is a diagram illustrating an example of a varying air gap magnetic flux.

The magnetic flux across an airgap will thus vary upon changing the relative displacement of the rotor 10 and the stator 20 along the direction of rotation 4. This is schematically illustrated in FIG. 4. By arranging the windings 30 to encircle this variable magnetic flux, the operation of an electrical machine can be achieved.

Figure 5:
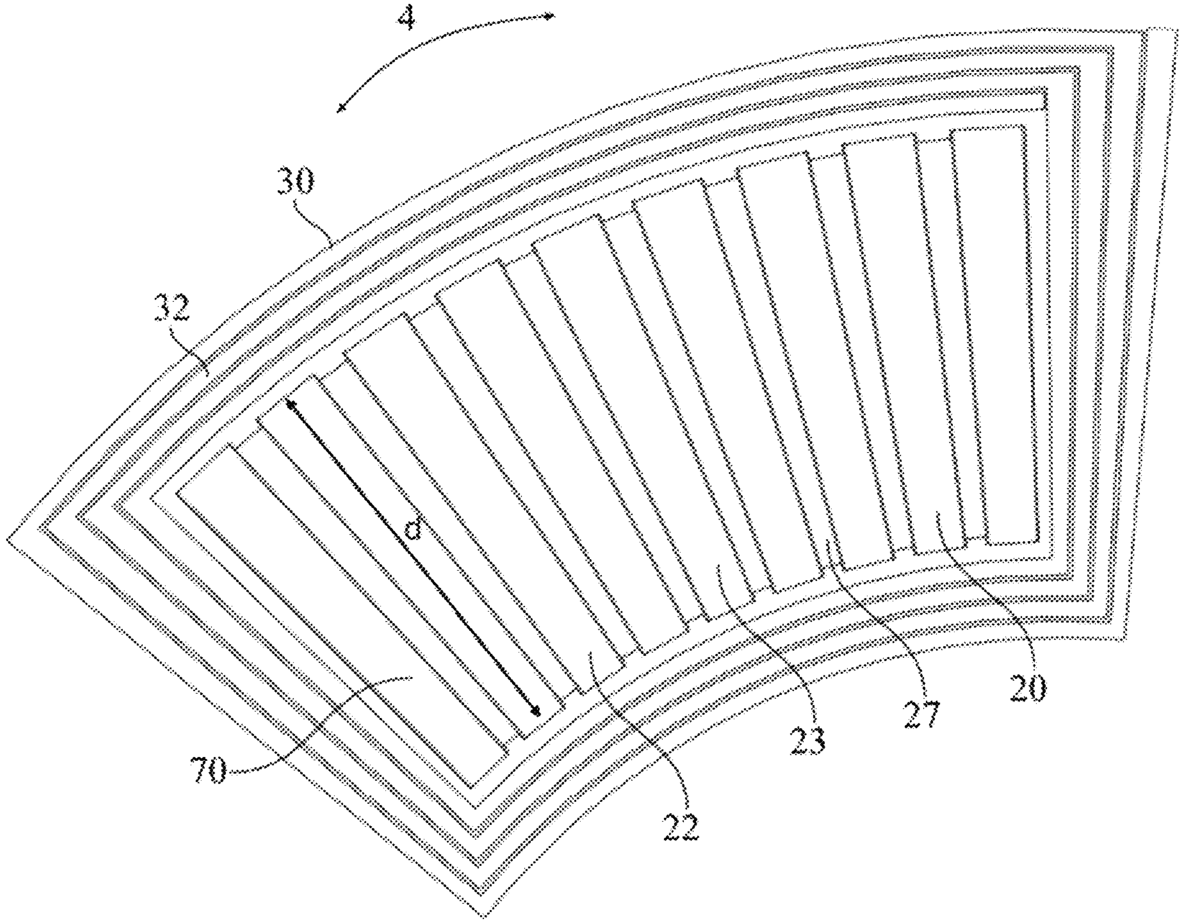
FIG. 5 is a schematic illustration of a cross-section of an embodiment of a stator magnetic structure and associated winding loops.

FIG. 5 illustrates an embodiment of a winding 30, having loops 32, i.e. a number of turns, provided around an encircled magnetic structure 70 in a stator section 22 of the stator 20 so that the winding makes one or more turns around the encircled magnetic structure 70. The changing magnetic flux of FIG. 4 will also be present over the encircled magnetic structure 70 in the stator section 22 of the stator 20. The loops 32 are generally extended parallel to the direction of rotation 4. In other words, the loops 32 have their main extension in the direction of rotation 4. In order to benefit from the substantially uniform direction of the magnetic flux to reduce the winding resistance in relation to the amount of power that is converted, it is beneficial to let the loops encircle a plurality of magnetic pole distances, i.e. the distance between consecutive magnetic poles of a same polarity, along the direction of rotation 4. In order to achieve a noticeable advantage, it is presently believed that at least 2.5 magnetic pole distances should be encircled by at least one single loop 32, corresponding to 5 magnetic poles. However, the more poles that are encircled by a single loop, the less winding material in total is required and the lower the resistive losses can be in relation to the power converted. In the FIG. 5, 9 magnetic poles are encircled.

In one embodiment, the winding is wound non-perpendicular to the direction of rotation around encircled magnetic structures 70 in two or more stator sections 22 of the stator.

In a further embodiment, the loops of the winding are wound parallel to the direction of rotation encircling a plurality of consecutive ones of the stator portions of magnetically permeable material.

The concept of magnetic gearing is used by that the winding is not wound between each individual pole but instead around many poles. This gets around the problem that the winding becomes longer and thinner when the poles are made shorter, which limits the low speed performance of standard machines. Typically, a whole phase is encircled in a simple loop, which means that the winding can be kept very short. Typically, the loop has a rectangular or similar shape. Also, the winding can be made several times thicker since there is plenty of space available and since it does not cost so much for a short winding. Altogether, this makes the winding resistance many times smaller than for standard machines.

Furthermore, in order to prevent the flux from leaking out of the structure, it is of benefit to provide winding loops from the same phase that encircles magnetic structures in several stator sections, arranged so that the stator sections are magnetically connected in series. This will be discussed more in detail below. It is believed that an effect can be achieved by having winding loops from the same phase that encircles magnetic structures in at least two of the stator sections. The more such stator sections that are provided, the more power per unit weight can be utilized and the lower the magnetic leakage flux will be. Preferably, at least three such stator sections are provided, more preferably at least four such stator sections are provided and most preferably at least six such stator sections are provided. In the embodiment of FIG. 1A, there are winding loops from the same phase that encircles magnetic structures in all three stator sections.

If the electrical machine is operated as a generator, the rotor 10 and the stator 20 are forced to move relative each other, inducing a voltage in the loops 32 of the windings 30. Likewise, if the electrical machine is operated as a motor, a varying current through the loops 32 of the windings 30 will result in a force between the rotor 10 and the stator 20, creating a relative motion.

Thus, in one embodiment, the electrical machine is a generator. A motion of the rotor relative to the stator gives rise to an induced alternating voltage in the winding.

In another embodiment, the electrical machine is a motor. An alternating current conducted through the winding causes a relative motion between the rotor and the stator.

The geometries that are presented here connect many air gaps in series magnetically. This creates arrays of sections, with many airgaps in between. Since the magnetic flux density is divergence free, the magnetic flux cannot vanish but must more or less continue into a closed loop. Thereby, if the array of sections themselves do not form a loop, which they do not do if they are for example flat, other blocks of magnetic material must be added to provide this function. These blocks of magnetic material are located in the end caps or outer sections of the machine. Since the flux is large, the magnetic field line paths in these blocks of magnetic material will become long. It is preferred to avoid unnecessary long magnetic field line paths in blocks of magnetic material such as iron, between the air gaps, since these blocks do not provide force or power but only extra mass, extra losses and extra costs. The size of the end caps is independent of the number of stator sections provided if they are magnetically connected in series. Thereby, the fraction of the end cap mass compared to the total mass of the machine becomes smaller if many stator sections are magnetically connected in series. This is also true for an axial flux machine, but the scaling of the invention is much more beneficial in this respect, since the stator sections can be made much thinner in the presented magnetic topology. Thereby, there is more to gain in having many stator sections magnetically connected in series in the invention compared to an axial flux machine.

In FIG. 1A the winding topology can be seen, where each phase comprises three phase winding loops which are magnetically connected in series. In this particular embodiment, the flux is returned through the other phases to form a closed loop. Each phase thereby resembles a sparse solenoid coil with an interior containing a mix of materials. The leakage flux in such a coil is very low, since the winding loops and the main magnetic reluctance in the magnetic circuit are in the same plane. The end caps more or less form a magnetic short circuit if they are properly dimensioned, so that almost all the magnetic reluctance of the magnetic circuit is located inside the winding loops. The main leakage flux present is the leakage flux that goes between the winding and the encircled magnetic structure, and through the winding itself. This leakage flux is predominantly axial for many geometries, and typically small in comparison with the flux that goes through the encircled magnetic structure. Thereby, such a machine can have an exceptionally high power factor compared to other modulated pole machines, and 0.8 can be reached in preferred embodiments. Also, such geometrical relations reduce problems with eddy currents in the windings and in the mechanical structure, as well as planar eddy currents in electric steel sheets.

The present technology thus utilizes geometrical effects to increase the force or torque density of the machine and increase its efficiency. This becomes particularly noticeable at low speed. In preferred embodiment, this can be achieved even without compromising the power factor. The technology presented here has therefore unprecedented performance in low speed applications such as direct drive and in applications where high force or torque densities are required. However, the technology is not limited thereto. Suitable applications are renewable energy conversion systems in general, e.g. wind power or ocean wave power, electric ship propulsion, replacement of gear motors, direct drive applications, electric vehicles and force dense actuators. However, the technology is not limited thereto and can be used in many other applications as well.

In the embodiments above, a stack of permanent magnets 27A, 27B, interleaved with stator portions of magnetically highly permeable material 23, acting as magnetic flux concentrating structures, have been illustrated. In other words, each stator section comprises permanent magnets 27A, 27B, arranged to present alternating poles along the surfaces 24, 26 facing the air gaps 40, whereby the stator periodicity equals the distance between two consecutive poles of a same polarity. Preferably, the loops of the winding are wound parallel to the direction of rotation encircling a plurality of consecutive stator sheets of magnetic material. However, the provision of a magnetic field can also be provided by other configurations.

Figure 6:
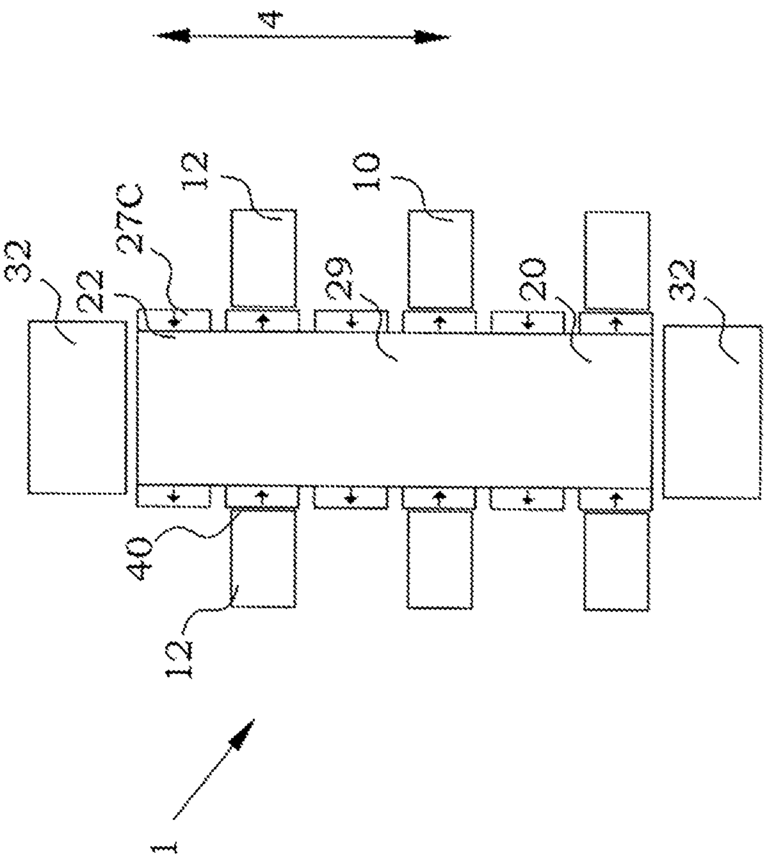
FIG. 6 is a schematic illustration of an embodiment of a geometrical relationship between first and second magnetic structures utilizing surface mounted permanent magnets.

FIG. 6 illustrates schematically a side view of a modulated pole machine with surface mounted magnets. This presents an alternative way to provide permanent magnet poles along the air gap 40 on the stator 20 in the direction of rotation 4. The stator 20 here comprises stator sections 22 that have a central body 29 of magnetic material. At the surface of the central body 29 surface mounted permanent magnets 27C are provided. With such a design, the polarity on opposite sides of the stator section 22 can be different, which means that the rotor sections 12 of the rotor 10 can be mounted without displacements in the direction of rotation 4. However, since there is a magnetic force on the surface mounted permanent magnets 27C perpendicular to the direction of rotation 4, there have to be means for securing a safe mounting of the surface mounted permanent magnets 27C.

Figure 7:
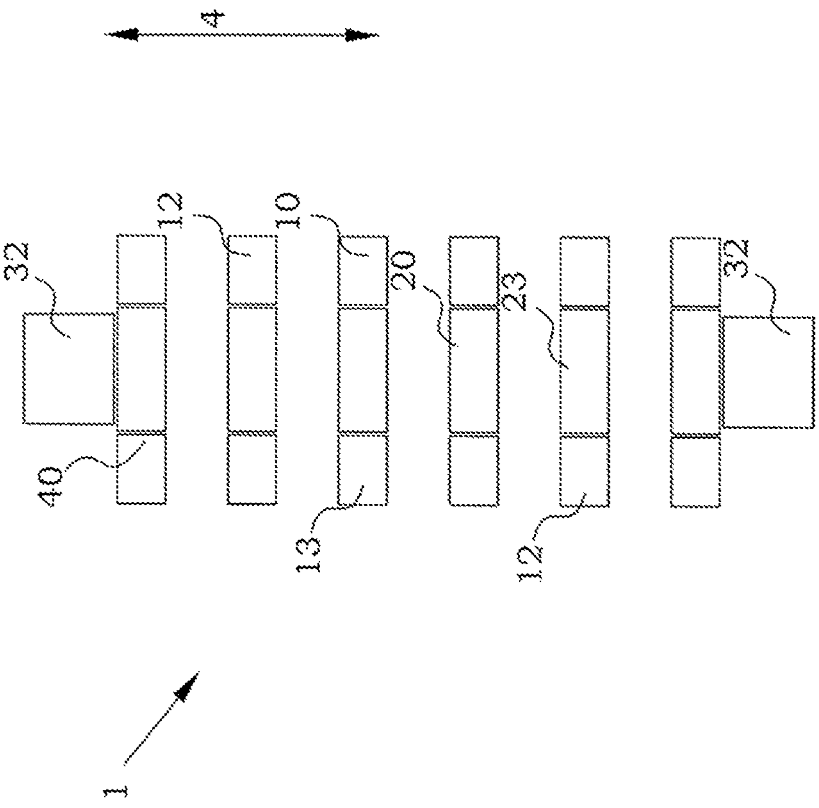
FIG. 7 is a schematic illustration of an embodiment of a geometrical relationship between first and second magnetic structures in a switched reluctance machine.

Most modulated pole machines comprise permanent magnets. However, in another embodiment, a switched reluctance machine design can be adopted. FIG. 7 illustrates a side view of the relation between the rotor 10 and the stator 20 in such an approach. The stator 20 here comprises stator portions of magnetically highly permeable material 23, e.g. blocks of electrical steel sheets 25. They are provided with essentially the same periodicity as the rotor portions of magnetically highly permeable material 13 of the rotor 10. Also here, deviations from the exact matching between the periodicities, as was discussed further above, can be applied. The stator 20 thus presents a variable magnetic permeability in the direction parallel to the predetermined motion path at each air gap. Worth noting here is that the periodicity of the rotor here counts as two poles, i.e. one electric period.

In other words, in one embodiment, both the stator 20 and the rotor 10 present variable magnetic permeability in the direction parallel to the predetermined motion path at each air gap, wherein a ratio of the respective periodicities equals an integer larger than 1.

The force in the switched reluctance embodiment is produced by simple attraction between the magnetic material in the rotor 10 and the magnetic material of the stator 20 when they are unaligned and magnetized by a current in the winding. This force can be in either direction dependent on the relative position between the rotor 10 and the stator 20. Thereby, one phase of the switched reluctance embodiment can only produce force in the desired direction for half of the electric period, two quadrants out of four, and remain passive during the other two quadrants. This is a drawback for the machine type, which directly halves the average force density and doubles the required number of phases. Also, the force is generally lower than for the permanent magnet embodiments, which is a further disadvantage, and the power factor and the efficiency is lower. The advantage of the switched reluctance embodiment is, however, that there are no expensive permanent magnets in the embodiment which lowers the material cost and does not create a dependency on the availability of permanent magnet materials such as neodymium and dysprosium for manufacturing of such units. Further, there are no attraction forces between the rotor 10 and the stator 20 when there is no current in the winding. Thereby, the manufacturing and assembly becomes considerably less complicated.

Thus, in one embodiment, at least one of the rotor sections comprises stacks of stator portions of magnetically permeable material, preferably having a main extension perpendicular to the direction of rotation, separated by non-magnetic material or slits, whereby the stator average distance is determined as an average distance between consecutive stator portions of magnetically permeable material.

In a further embodiment, loops of the winding are wound parallel to the direction of rotation encircling a plurality of consecutive ones of the stator portions of magnetically permeable material.

It could be noted that in some embodiments, the switched reluctance approach can be combined with magnetized magnetic structures. To this end, some parts of the stator can be of a reluctance switched type, as described here above, while other parts sections of the stator may have a structure based on magnets, e.g. according to any of the embodiments described in connection with FIGS. 1A-6.

Figure 8:
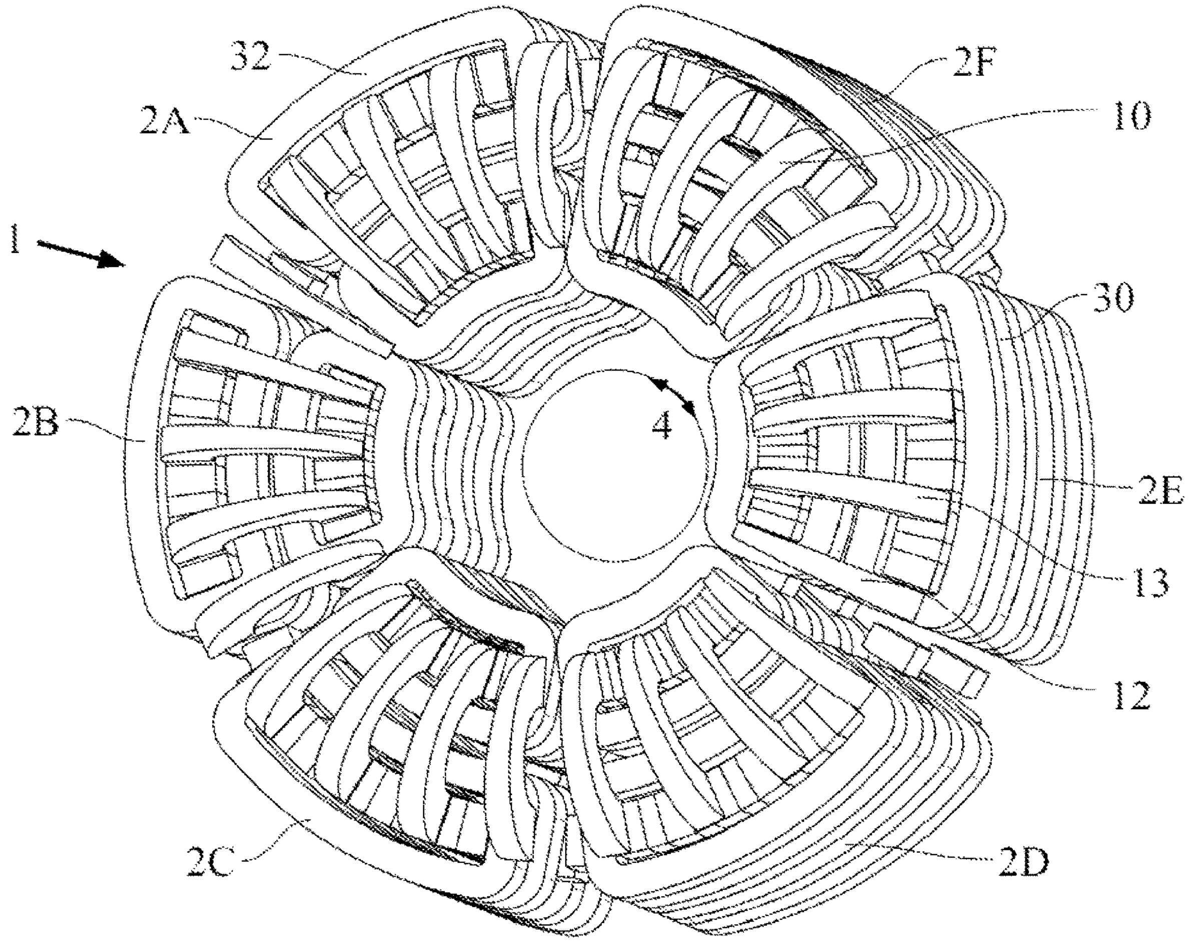
FIG. 8 is a schematic illustration of parts of an embodiment of a modulated pole machine having a poloidal flux.

FIG. 8 illustrates one embodiment of a rotating machine where there are two separate layers of coils in the radial direction in the stator sections. The inner coils and corresponding respective magnetic structures are 180 electrical degrees out of phase compared to the outer coils and their respective magnetic structures which are at the same mechanical angular position. The rotor 10, having a main toroidal shape, presents a rotor section 12 having a number of rotor portions of magnetically highly permeable material 13 provided in the direction of rotation 4. The rotating electrical machine 1 has in this embodiment six phases 2A-F, and depending on the detailed displacements between the rotor 10 of the different phases, the machine can be a one, two, three or six phase machine. Such a machine can of course have any number of phases larger than 1. A number of loops 32 of a winding are seen at the outside and inside of the main toroidal shape. The rest of the stator is hard to see in this view.

As briefly mentioned above, the rotor and stator sections 12, 22 at the inner side of the curvature, i.e. facing the center of the rotating machine, have a slightly smaller average distance between the repetition of the magnetic behavior of the rotor and stator 10, 20 along the direction of rotation than sections at the outer side. However, typically, neighboring sections still fall within the above discussed 20% discrepancy range.

FIG. 9 is a part of a cut-away illustration of the embodiment of FIG. 8. Here, it can be seen that there is a "race-track shaped" cross-section. The long sides comprise alternating inner rotor and stator sections 12A, 22 of the rotor 10 and stator 20, respectively. At the ends of the "race-track", outer rotor sections providing radial flux transport, 12D of the rotor 10 close the magnetic path into a closed path. Loops 32 of the windings are provided at the outside and inside of the "race-track", i.e. inside and outside of the closed magnetic part, separated by support distance blocks. The loops 32 are extended to enclose parts of the stator 20 belonging to a phase of the machine.

When studying the particular embodiment of FIGS. 8-9, it can be noticed that the magnetic flux crossing airgaps 40 are directed mainly in a poloidal direction. Since the machine operates due to changes in the magnetic flux along the poloidal direction, this type of machine can therefore be denoted as a poloidal flux machine.

Thus, in one embodiment, the electrical machine is a poloidal flux machine.

In rotary machines having only one phase in each stator section, the winding may be provided in a somewhat special way. This is illustrated in FIG. 10. In this embodiment, the winding 30 is provided as one single loop encircling the entire rotary machine, interior of the magnetic path. Within one stator section, the loop may be divided into several winding turns, but these turns are then adjacent loops.

This embodiment has the advantage of a shorter winding in relation to the enclosed flux, compared to the embodiments comprising several phase windings in each stator section like the embodiment shown in FIG. 1A, since no return winding is required, which then reduces the conductive losses for one particular embodiment. This then reduces the conductive losses for one particular embodiment. The drawback is that one closed magnetic loop comprising at least two stator sections and comprising two end caps is required for each phase, and that at the very least two or preferably three phases with separate magnetic circuits are required to produce a constant torque which is normally necessary. Thereby, each conductor ring magnetizes less material and produces less force since each stator section airgap area must be smaller for the same total torque of the machine, which makes the reduction of resistive losses less prominent. Also, more bearings are required since there will be several stator sections for each phase, and the power factor will be lower since there will be a leakage flux inside the ring winding outside the airgaps. Finally, more end caps are required.

In the present disclosure, a winding loop is often discussed. To clarify, it should be noted that when the length of this loop is discussed, this refers to the length of the conductor which forms the loop. Further, if several turns of the same loop is made, the length should be taken for one turn only.

Figure 11:
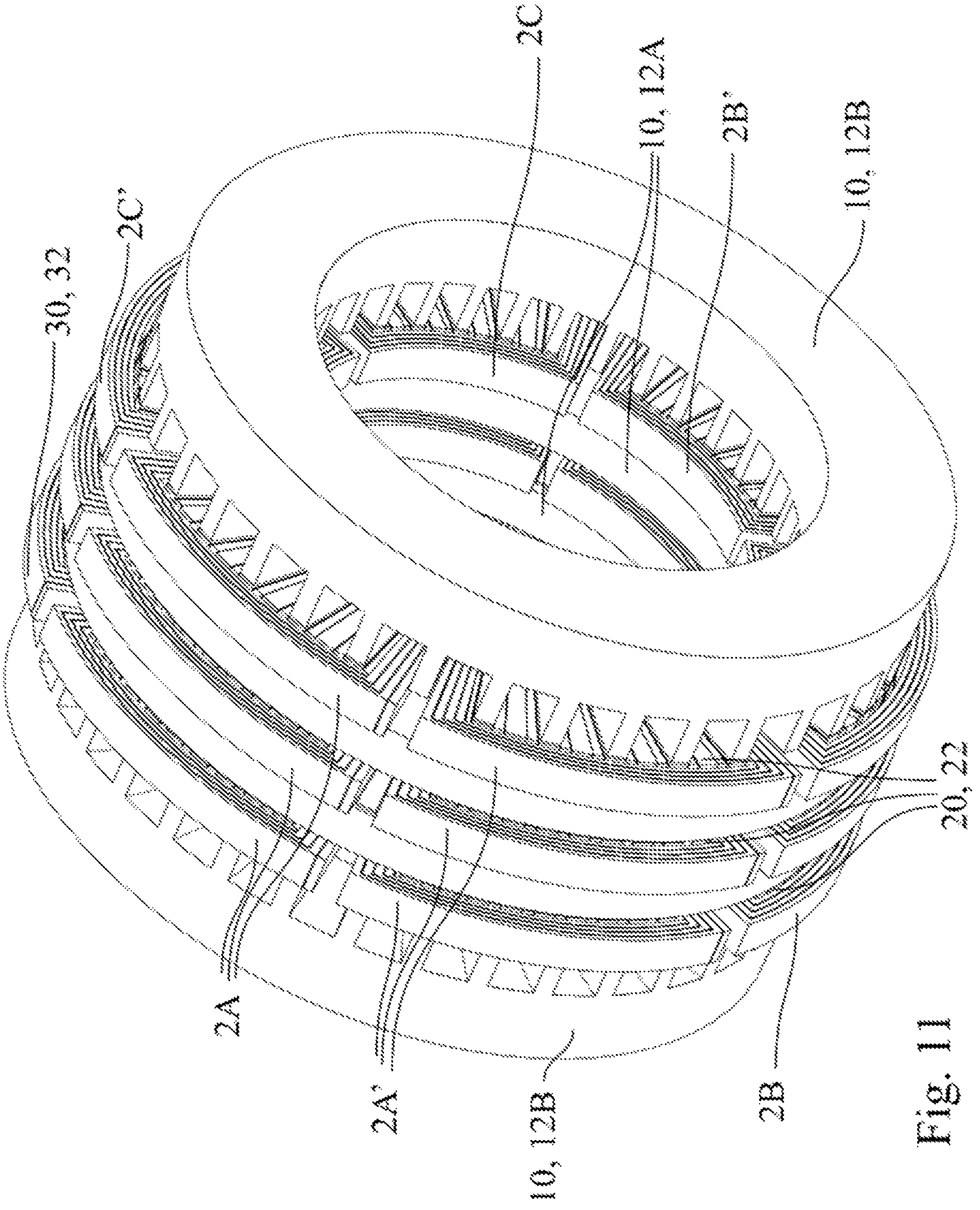
FIG. 11 is an illustration of an embodiment where each phase in a stator disc is independent of the other phases, having its own magnetic return path.

In FIG. 11, an embodiment similar to the embodiment shown in FIG. 1A is shown. This embodiment has 6 separate encircled magnet structures on each stator section, each encircled by winding loops 32. However, these 6 encircled magnet structures are organized in three pairs of adjacent encircled magnet structures, being 180 electrical degrees out of phase with each other. Thereby, the same phase winding can be used to wind around both these encircled magnet structures but in opposite directions. For example, the winding for 2A and 2A' is from the same phase. Thereby, this embodiment forms a three-phase machine with the phase windings 2A+2A', 2B+2B' and 2C+2C'. Each phase is then magnetically separated from the other phases, since the magnetic flux that goes through the non-primed winding loops has a return path through the primed winding loops. This is beneficial from the controller point of view.

Figure 12:
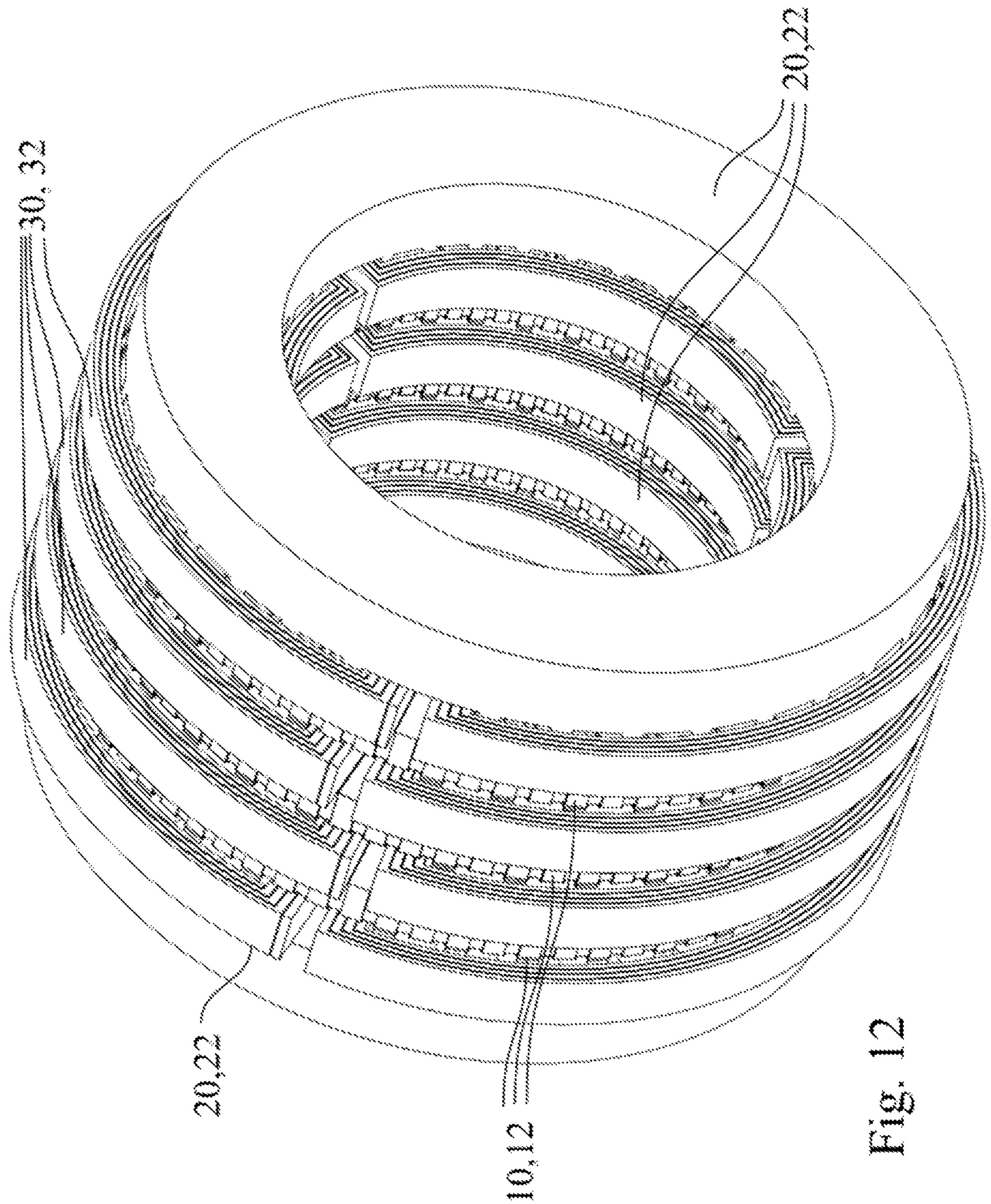
FIG. 12 is an illustration of an embodiment similar to the one shown in FIG. 1A, but where the magnetic topologies have been switched between the rotor and the stator.

In all embodiments presented here there is one type of magnetic topology in the rotor, and another type of magnetic topology in the stator in the encircled magnetic structure that is encircled by a phase winding loop. It is, however, fully possible in all these embodiments to exchange these magnetic topologies so that the magnetic topology in the rotor is instead placed in the stator in the encircled magnetic structure encircled by a winding, and so that the magnetic topology of the encircled magnetic structure in the stator is instead implemented in the rotor. FIG. 12 illustrates such an embodiment. The new embodiment accomplished by this change gives a modulated pole machine which has a very similar performance to the original embodiment. A disadvantage for permanent magnet machines with such an embodiment is that more magnets are needed if they are placed in the rotor, since all of the rotor surface area is not used simultaneously. On the other hand, an advantage is that it is more low cost to increase the axial thickness of such a stator to fit in more winding material, since the stator does not contain permanent magnets.

Similarly, the embodiments presented here has end caps, or outer rotor sections, 12B belonging to the rotor. Instead, all embodiments here could instead have end caps belonging to the stator, comprising winding, as illustrated in FIG. 12. The new embodiment accomplished by such a change would give an electrical machine operating by switching of magnetic flux which has a very similar performance to the original embodiment.

Figure 13A:
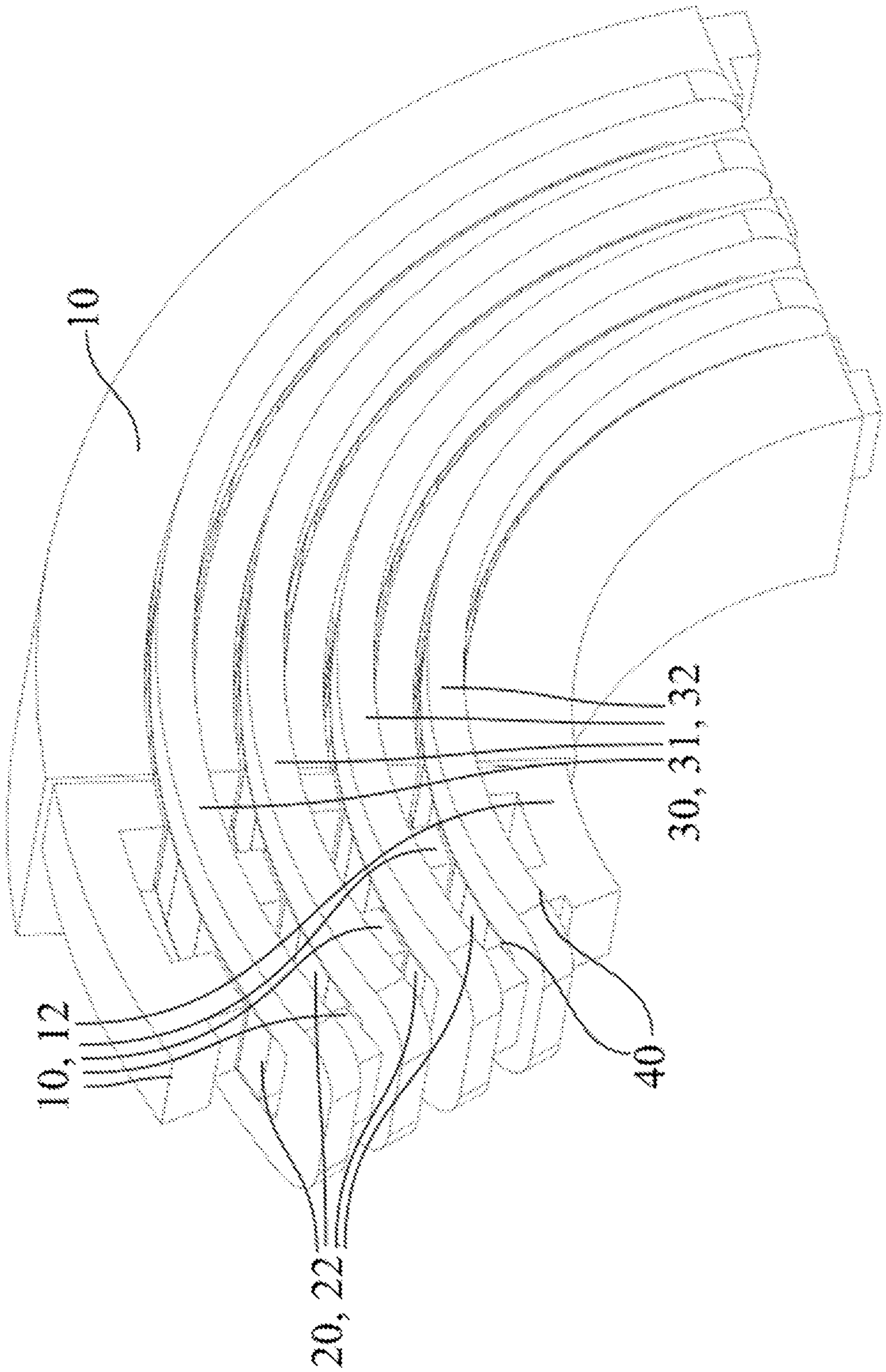
FIGS. 13A-B illustrate two embodiments where the magnetic flux is predominantly in a radial direction.

In FIG. 13A, an embodiment is shown where the magnetic flux is predominantly in the radial direction, instead of being predominantly in the axial direction as in earlier embodiments. In this particular embodiment, there are 4 stator sections 22 and 5 rotor sections 12, and the flux loop is closed in the outer rotor sections in the direction of rotation.

Figure 13B:
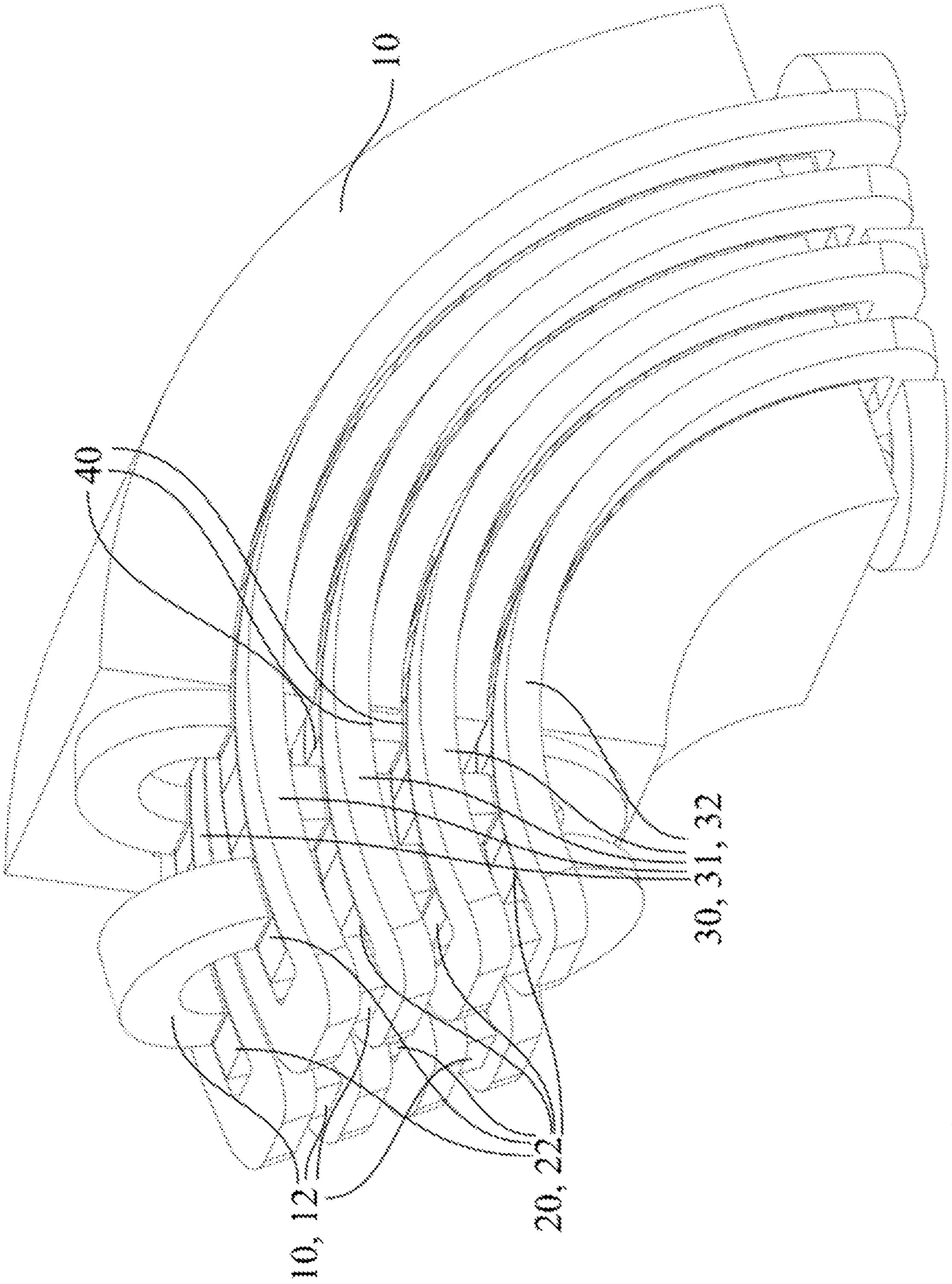

FIG. 13B shows a similar embodiment with a magnetic flux predominantly in the radial direction, where there are instead two parallel rows of magnetically active material in each section separated by an axial distance and the flux loop is instead closed in the axial direction in the outer rotor sections, forming a poloidal flux loop.

The radial flux embodiments are more complex to build than their axial flux counterparts since the geometry is more complex. However, an advantage is that the sections become stiffer due to the curvature, which facilitates construction of machines without local bearing arrangements.

In the present technology, electrical steel is a competitive option to use as a highly permeable material both in the rotor and stator. It is, however, fully possible in the present ideas to use a special type of electrical steel, grain-oriented electrical steel. Grain-oriented electrical steel give rise to significantly lower iron losses than ordinary non-oriented electrical steel if the magnetic field is directed in a preferred rolling direction and switches back and forth in this direction instead of rotating. Therefore, it is typically used in electrical transformers. In the invention, the magnetic field to a large degree has this property, which allows for the use of grain-oriented electrical steel instead of non-oriented electrical steel to reduce the iron losses during operation. Thus, in one embodiment the electrical machine comprises grain-oriented electrical steel.

Since the technology presented here has very excellent performance in low speed applications, the use of machines according to the previous description in low-speed applications is advantageous. The most important application is probably direct drive generators and motors, but systems operating at characteristic speeds lower than 5 m/s are also believed to be particularly suitable. A characteristic speed is defined as a typical relative motion speed between the rotor and the stator at the airgap. Suitable applications are typically renewable energy conversion systems, wind power, tidal power, ocean wave power, electric ship propulsion, replacement of gear motors, i.e. in gearless motors, traction motors, direct drive systems in general, and force dense actuators.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] EP3325800A1.

[2] Hagneståal, Anders, and Erling Guldbrandzén. "A highly efficient and low-cost linear TFM generator for wave power." EWTEC 2017: the 12th European Wave and Tidal Energy Conference 27th August-1 Sept. 2017, Cork, Ireland. European Wave and Tidal Energy Conference, 2017.

[3] Hagneståal, A., 2016, "A low cost and highly efficient TFM generator for wave power," The 3rd Asian Wave and Tidal Energy Conference AWTEC, pp. 822-828.

[4] Hagneståal, A., 2018, "On the Optimal Pole Width for Direct Drive Linear Wave Power Generators Using Ferrite Magnets," Energies, 11(6).

[5] EP2982028A2.

[6] Washington, Jamie G., et al. "Three-phase modulated pole machine topologies utilizing mutual flux paths." IEEE Transactions on Energy Conversion 27.2 (2012): 507-515.

The invention claimed is:

1. A rotating electrical machine, being a modulated pole machine operating by switching of magnetic flux, comprising:

a rotor;

a stator;

wherein said stator comprises permanents magnets, wherein said electrical machine is a variable reluctance permanent magnet machine which operates by switching of magnetic flux; and a winding;

wherein said winding comprises at least two phase windings;

wherein said rotor and stator comprise respective sections interleaved with each other via more than 4 air gaps, said air gaps are parallel to a direction of rotation, said direction of rotation being the direction of movement of said rotor relative to said stator at said airgaps;

wherein at least one of said sections being part of said rotor is an isolated rotor section which comprises magnetically highly permeable material separated by electrically non-conducting structure material; and wherein said windings present two separate layers of winding loops in a radial direction in said stator sections, wherein currents in the inner winding loops and corresponding respective magnetic structures are 180 electrical degrees out of phase compared to currents in the outer winding loops and corresponding respective magnetic structures.

2. The electrical machine according to claim 1, wherein said winding loop encloses magnetic flux from n magnetic poles of the same polarity, where n is larger than 2, and said winding loop encloses a total magnetic flux being larger than the flux from one individual magnetic pole, preferably being larger than the flux from two times the magnetic flux from one individual magnetic pole, where said winding loop length is shorter than 2*n*d, preferably shorter than n*d, where d is an airgap width distance, where said airgap width distance being the average width of the magnetically active part of said airgaps enclosed by the winding loop taken in a direction parallel to said airgaps and perpendicular to said direction of rotation, where said magnetic poles are provided in at least one of said rotor and said stator.

3. The electrical machine according to claim 2, wherein n is larger than 4 and preferably n is larger than 6.

4. The electrical machine according to claim 1, wherein at least one of said winding loops, being a first winding loop, encloses magnetic flux from at least 5 magnetic poles where at least 30%, preferably at least 50%, more preferably at least 70% even more preferably at least 90% and most preferably 100% of the flux from said at least 5 magnetic poles are external to all other winding loops belonging to another phase and located in the same said section as said first winding loop.

5. The electrical machine according to claim 1, wherein said sections are flat discs and that the magnetic flux in said electrical machine is predominantly directed in the axial direction.

6. The electrical machine according to claim 1, wherein said electrical machine comprises ferrite magnets.

7. The electrical machine according to claim 1, wherein said electrical machine comprises neodymium magnets.

8. The electrical machine according to claim 1, wherein said electrical machine comprises permanent magnets arranged in a flux-concentrating setup.

9. The electrical machine according to claim 1, wherein said electrical machine comprises grain-oriented electrical steel.

10. The electrical machine according to claim 1, wherein at least one section comprises winding loops being part of more than 2 different phases, preferably more than 3 different phases, more preferably more than 4 different phases, even more preferably more than 5 different phases, even more preferably more than 6 different phases, even more preferably more than 9 different phases and most preferably more than 12 different phases.

11. The electrical machine according to claim 1, wherein at least one first section of said sections comprises first inner and outer winding loops of said winding loops, said first inner and outer winding loops of said winding loops belonging to one first phase, wherein said first section of said sections lacks inner and outer winding loops belonging to other phases than said first phase.

12. The electrical machine according to claim 1, wherein said electrical machine has more than 3 phases, preferably more than 6 phases, more preferably more than 9 phases, even more preferably more than 12 phases and most preferably more than 15 phases.

13. A system comprising an electrical machine according to claim 1, said system being selected among:

a renewable energy conversion system, a wind power plant, a tidal power plant, an ocean wave power plant, an electric ship propulsion system, a gearless motor, an electric vehicle, a direct drive system, and a force dense actuator.

14. The electrical machine according to claim 1, wherein each of at least 2 different of said sections comprises a winding loop from the same said phase winding.

15. The electrical machine according to claim 14, wherein each of at least 3 different of said sections comprises a winding loop from the same said phase winding.

16. The electrical machine according to claim 1, wherein said winding loop encloses a total magnetic flux that is larger than the magnetic flux from 2 individual magnetic poles of the same polarity.

17. The electrical machine according to claim 1, wherein respective magnetic structures enclosed within said inner and outer winding loops of said stator sections are provided at a same mechanical angular position.

* * * * *